US 6,560,515 B2

(12) United States Patent
Inoue

(10) Patent No.: US 6,560,515 B2
(45) Date of Patent: May 6, 2003

(54) CONTROL APPARATUS FOR ELECTRIC VEHICLE

(75) Inventor: Takahito Inoue, Kobe (JP)

(73) Assignee: Nabco, Ltd., Kobe (JP)

( * ) Notice: Subject to any disclaimer, the term of this patent is extended or adjusted under 35 U.S.C. 154(b) by 16 days.

(21) Appl. No.: 09/963,536

(22) Filed: Sep. 27, 2001

(65) Prior Publication Data

US 2002/0040264 A1 Apr. 4, 2002

(30) Foreign Application Priority Data

Oct. 4, 2000 (JP) ........................................ 2000-304905

(51) Int. Cl.⁷ .............................. A61G 5/04; B60L 7/02
(52) U.S. Cl. .......................... 701/22; 180/206; 180/907
(58) Field of Search ............................ 701/22; 180/205, 180/206, 207, 6.5, 6.52, 65.8, 907; 318/55, 56, 139

(56) References Cited

U.S. PATENT DOCUMENTS

| 4,422,515 | A | * | 12/1983 | Loveless | ..................... | 180/6.5 |
| 5,746,282 | A | * | 5/1998 | Fujiwara et al. | ............. | 180/6.2 |
| 5,927,414 | A | * | 7/1999 | Kan et al. | .................. | 180/19.3 |
| 6,003,627 | A | * | 12/1999 | Ishida | ........................ | 180/206 |
| 6,020,701 | A | * | 2/2000 | Ishida | ........................ | 318/362 |
| 6,230,831 | B1 | * | 5/2001 | Ogata et al. | ................ | 180/65.1 |
| 6,302,226 | B1 | * | 10/2001 | Kanno et al. | ................ | 180/6.5 |

FOREIGN PATENT DOCUMENTS

| JP | 3031063 | 2/1991 |
| JP | 10-99378 | 4/1998 |
| JP | 10-201792 | 8/1998 |
| JP | 10-336803 | 12/1998 |
| JP | 11-262111 | 9/1999 |
| JP | 11-263227 | 9/1999 |
| JP | 2000-42045 | 2/2000 |
| JP | 2000-152425 | 5/2000 |

* cited by examiner

Primary Examiner—Michael J. Zanelli
(74) Attorney, Agent, or Firm—Oblon, Spivak, McClelland, Maier & Neustadt, P.C.

(57) ABSTRACT

A control apparatus for an electric vehicle which improves the operability of an electric wheelchair on slopes is provided. The control apparatus includes a control unit which, when it determines that a rotational direction corresponding to a direction of an operation force is opposite to a rotational direction in which a driving wheel is actually rotated, sets an operation mode of the motor for driving the wheel to an electrical braking mode. Thus, the electric wheelchair is decelerated and the load on the operator is reduced. The control unit may control the motor such that the motor does not generate an electrical braking force until the driving wheel is rotated by a predetermined amount. In such a case, even when the driving wheel temporarily rotates in the reverse direction while it climbs up an upward slope, an unnecessary electrical braking force is not generated.

17 Claims, 18 Drawing Sheets

CONTROL APPARATUS FOR ELECTRIC VEHICLE

BACKGROUND OF THE INVENTION

1. Field of the Invention

The present invention relates to control apparatuses for electric vehicles.

2. Description of the Related Art

As an example of a conventional electric vehicle, an electric wheelchair is disclosed in Japanese Unexamined Patent Application Publication No. 10-99378. According to this publication, the electric wheelchair is moved by both an operation force applied by a caregiver who pushes and pulls the vehicle and a driving force generated by a motor based on the operation force. The direction and amount of the operation force are detected by operation force detecting means provided in handles, and when the amount of operation force applied by the caregiver exceeds a predetermined value, the driving force is generated by the motor. The operation force detecting means may also be installed in handrims provided along the circumference of wheels.

In the above-described electric wheelchair, the operation force detecting means detects the operation force applied either on the handles by the caregiver or on the handrims by the occupant, and the driving force is provided by the motor based on the result of the detection. Accordingly, on upward slopes, for example, a driving force in the forward direction is provided by the motor in accordance with the operation force applied, so that the load on the operator is reduced. In addition, when the operator applies the operation force in the reverse direction on downward slopes, a driving force in the reverse direction is generated by the motor so as to prevent acceleration of the electric wheelchair. Accordingly, the load on the operator is reduced.

However, in the above-described conventional electric vehicle, when the operator wishes to maintain a certain speed on a downward slope, it is difficult to establish an adequate balance between gravity, which tries to rotate the wheels in the forward direction, and the force applied by the motor, which tries to rotate the wheels in the reverse direction. As a result, the operation force varies, so that the movement of the vehicle cannot be adequately controlled.

SUMMARY OF THE INVENTION

Accordingly, in view of the above-described problems, an object of the present invention is to provide a control apparatus for an electric vehicle which ensures the stability of the operation force even on slopes and which improves the operability of the electric vehicle.

According to one aspect of the present invention, a control apparatus for an electric vehicle having wheels driven by motors, the control apparatus comprises an operation force detecting unit which detects a direction and an amount of an operation force applied to the electric vehicle by an operator; a rotational direction detecting unit which detects a rotational direction of each wheel of the electric vehicle; and a control unit which controls each motor such that the motor generates a driving force in accordance with the operation force detected by the operation force detecting unit and that, when the control unit determines that the rotational direction of each wheel detected by the rotational direction detecting means is opposite to the rotational direction corresponding to the direction of the operation force detected by the operation force detecting means, the motor generates an electrical braking force. In the control apparatus for an electric vehicle which is constructed as described above, the control unit controls each motor such that, when it determines that the rotational direction of each wheel is opposite to the rotational direction corresponding to the direction of the operation force, generates the electrical braking force. Thus, when the operator applies the operation force in the direction opposite to the moving direction of the electric vehicle on a slope, the electrical braking force is generated and the load placed on the operator is reduced. Accordingly, the speed of the vehicle can be controlled without applying a force larger than necessary. As a result, the movement of the vehicle is adequately controlled, and the operability thereof on slopes is improved.

The control unit may increase the electrical braking force as the operation force is increased, the operation force being applied in the direction corresponding to the rotational direction opposite to the rotational direction of the corresponding wheel and being detected by the operation force detecting means. In such a case, the electrical braking force can be adjusted in accordance with the amount of operation force which is applied in the direction opposite to the direction corresponding to the rotational direction of the corresponding wheel. As a result, the operability on slopes can be further improved.

In addition, when the electrical braking force is generated, the control unit may reduce the electrical braking force as the operation force is increased, the operation force being applied in the direction corresponding to the same rotational direction as the rotational direction of the corresponding wheel and being detected by the operation force detecting means. In such a case, the electrical braking force is gradually reduced instead of being set to 0 immediately. Accordingly, safety is ensured and the movement of the vehicle is adequately controlled.

In addition, the control unit may determine the electrical braking force by accumulating a change therein, and the absolute value of the change in the electrical braking force may be increased as the operation force detected by the operation force detecting means is increased. In such a case, since the electrical braking force is immediately increased in accordance with the operation force, the electrical braking force quickly responds to the operation force. Accordingly, safety and quick response of the vehicle are insured.

In addition, the change in the electrical braking force may be 0 when the operation force detected by the operation force detecting means is less than a predetermined value, and, when the operation force detected by the operation force detecting means exceeds the predetermined value, the absolute value of the change in the electrical braking force is increased in accelerating manner as the operation force detected by the operation force detecting means is increased. In such a case, the electrical brake is prevented from responding too sensitively when a small operation force is applied. In addition, since the electrical braking force is increased in accelerating manner in accordance with the operation force, the electrical braking force quickly responds to the operation force. Accordingly, safety and quick response of the vehicle are insured.

In addition, the electrical braking force may have an initial value which is a fixed value. In such a case, the initial electrical braking force is always the same. Accordingly, the operability of the vehicle in the braking operation can be improved.

In addition, the control unit may control the motors for driving right and left wheel such that the motors generate the electrical braking forces independently of each other, and the control unit may gradually increase the smaller one of the electrical braking forces so as to make the smaller one of the electrical braking forces closer to the larger one. In such a case, the coordination between the right and the left wheels can be achieved, and the movement of the vehicle can be adequately controlled.

In addition, control unit may set the electrical braking force to 0 when a state, in which the corresponding wheel is stationary and the operation force detected by the operation force detecting means is less than a predetermined value, is maintained for a predetermined period of time. In such a case, when the vehicle is stopped and then restarted, the electrical braking force is removed so that the vehicle can be easily moved again. Accordingly, the operability of the vehicle is improved.

According to another aspect of the present invention, a control apparatus for an electric vehicle having wheels driven by motors, the control apparatus comprises an operation force detecting means which detects a direction and an amount of an operation force applied to the electric vehicle by an operator; a rotational direction detecting unit which detects a rotational direction and the amount of rotation of each wheel of the electric vehicle; and a control unit which controls each motor such that the motor generates a driving force in accordance with the operation force detected by the operation force detecting unit and that, when the control unit determines that each wheel is rotated by a predetermined amount in a rotational direction and that the rotational direction is opposite to the rotational direction corresponding to the direction of the operation force detected by the operation force detecting unit, the motor generates an electrical braking force. In the control apparatus for an electric vehicle which is constructed as described above, the control unit controls each motor such that, when it determines that the rotational direction of each wheel is opposite to the rotational direction corresponding to the direction of the operation force, generates the electrical braking force. Thus, when the operator applies the operational force in the direction opposite to the moving direction of the electric vehicle on a slope, the electrical braking force is generated and the load placed on the operator is reduced. Accordingly, the speed of the vehicle can be controlled without applying a force larger than necessary. As a result, the movement of the vehicle is adequately controlled, and the operability thereof on slopes is improved. In addition, the electrical braking force is not applied until the corresponding wheel is rotated by a predetermine amount in a rotational direction. Thus, even when the driving wheel temporarily rotates in the reverse direction while it climbs up an upward slope, the electrical braking force is not applied until it rotates by a predetermined amount. Then, when the vehicle starts to climb up the upward slope again, the electrical assist force can be immediately applied. Accordingly, the operability of the vehicle is further improved.

In addition, according to another aspect of the present invention, a control apparatus for an electric vehicle having wheels driven by motors, the control apparatus comprises an operation force detecting unit which detects a direction and an amount of an operation force applied to the electric vehicle by an operator; a rotational direction detecting unit which detects a rotational direction of each wheel of the electric vehicle; and a control unit which controls each motor in accordance with the operation force detected by the operation force detecting unit, and which selectively switches the operation mode for each motor over a driving mode in which the motor generates a driving force in accordance with the operation force detected by the operation force detecting unit, a braking mode in which the motor generates an electric driving force when the absolute value of the operation force detected by the operation force detecting unit is less than the predetermined value, and a downward slope braking mode in which the motor generates an electric braking force when the rotational direction of each wheel detected by the rotational direction detecting unit is opposite to the rotational direction corresponding to the direction of the operation force detected by the operation force detecting unit. In the control apparatus for an electric vehicle which is constructed as described above, the control unit sets the operation mode to the downward slope braking mode when it determines that the rotational direction of each wheel is opposite to the rotational direction corresponding to the direction of the operation force. Then, the motor generates the electrical braking force. Thus, when the operator applies the operation force in the direction opposite to the moving direction of the electric vehicle on a slope, the electrical braking force is generated and the load placed on the operator is reduced. Accordingly, the speed of the vehicle can be controlled without applying a force larger than necessary. As a result, the movement of the vehicle is adequately controlled, and the operability thereof on slopes is improved. In addition, when the absolute value of the operation force detected by the operation force detecting unit is less than the predetermined value, the control unit sets the operation mode to the braking mode and controls the motor such that the motor generates the electrical braking force so as to decelerate the vehicle. Accordingly, when the operation force is removed, the electric vehicle is safely decelerated.

When the control unit switches the operation mode from the downward slope braking mode to the braking mode, the initial electrical braking force generated in the braking mode may be set to the electrical braking force generated in the downward slope braking mode. In such a case, the initial value of the electrical braking force generated in the braking mode is set to the electrical braking force applied in the end of the downward slope braking mode. Thus, the temporary loss of the braking force does not occur immediately after the operation mode is changed.

In addition, when the control unit switches the operation mode from the braking mode to the downward slope braking mode, the initial electrical braking force generated in the downward slope braking mode may be set to the electrical braking force generated in the previous downward slope braking mode operation. In such a case, the initial electrical braking force generated in the downward slope braking mode is set based on the electrical braking force generated in the previous downward slope braking mode operation. Accordingly, the temporary loss of the braking force does not immediately after the operation mode is changed to the downward slope braking mode again.

In addition, when the operation mode is not the downward slope braking mode, and when the control unit determines that the corresponding wheel is rotated by a predetermined amount in a rotational direction and that the rotational direction is opposite to the rotational direction corresponding to the direction of the operation force detected by the operation force detecting unit, the control unit may switch the operation mode to the downward slope braking mode. In such a case, the operation mode is not changed to the downward slope operation mode and the electrical braking force is not applied until the corresponding wheel is rotated by a predetermined amount in a rotational direction. Thus, even when the driving wheel temporarily rotates in the reverse direction while it climbs up an upward slope, the electrical braking force is not applied until it rotates by a predetermined amount. Then, when the vehicle starts to climb up the upward slope again, the electrical assist force can be immediately applied. Accordingly, the operability of the vehicle is further improved.

In addition, the control unit may set the electrical braking in the downward slope braking mode operation based on only the rotational direction of the corresponding wheel detected by the rotational direction detecting unit and the rotational direction corresponding to the direction of the operation force detected by the rotational force detecting unit. Thus, when the vehicle moving down a slope stops and starts to climb up again, the control unit immediately responds and reduces the electrical braking force. Accordingly, the operability is further improved.

BRIEF DESCRIPTION OF THE DRAWINGS

FIG. 12A shows the case in which the requested operation is on "brake" and FIG. 12B shows the case in which the requested operation is on "assist";

DESCRIPTION OF THE PREFERRED EMBODIMENTS

Figure 13:
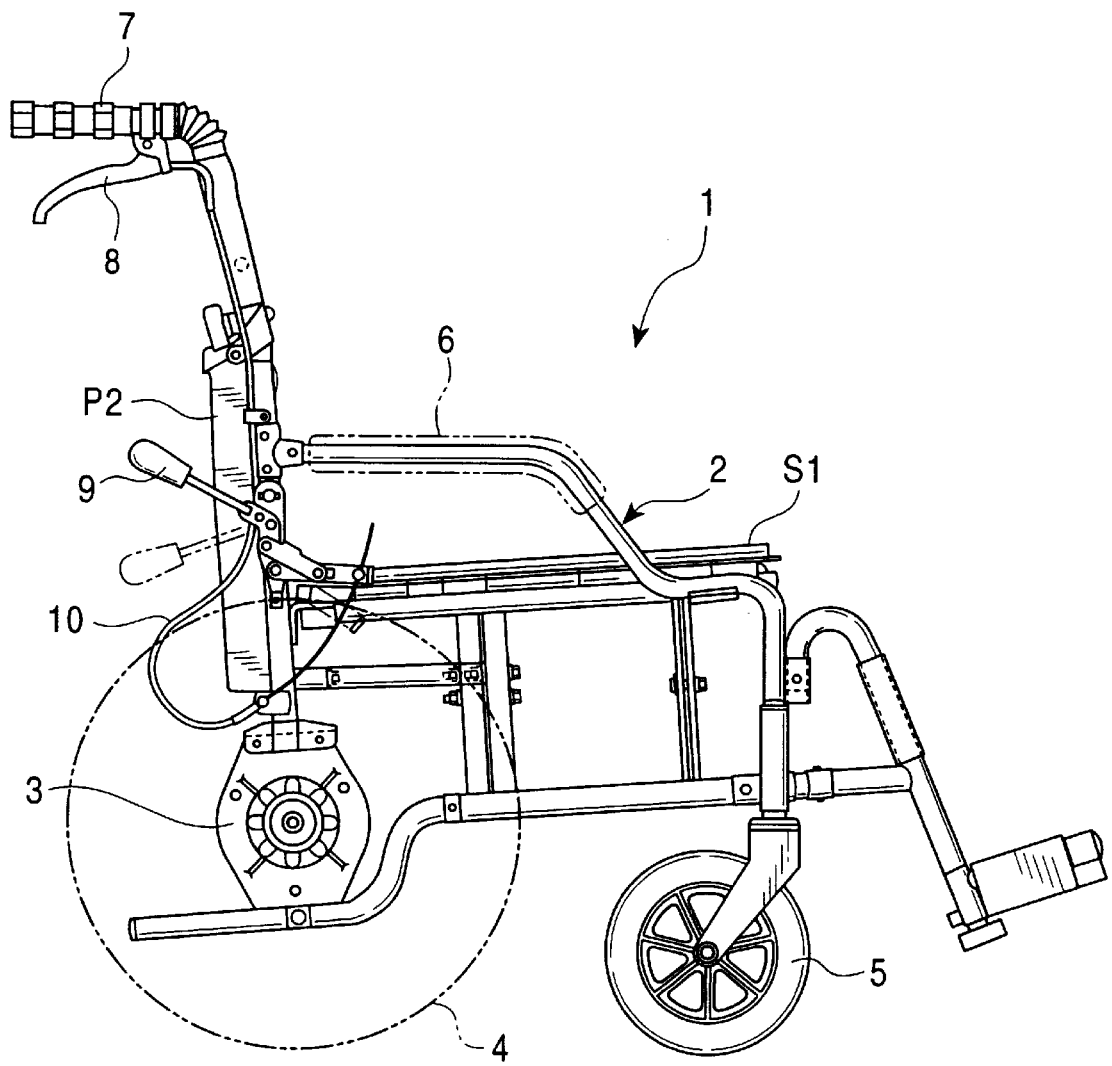
FIG. 13 is a side view of an electric wheelchair in which the control apparatus is mounted.
Figure 14:
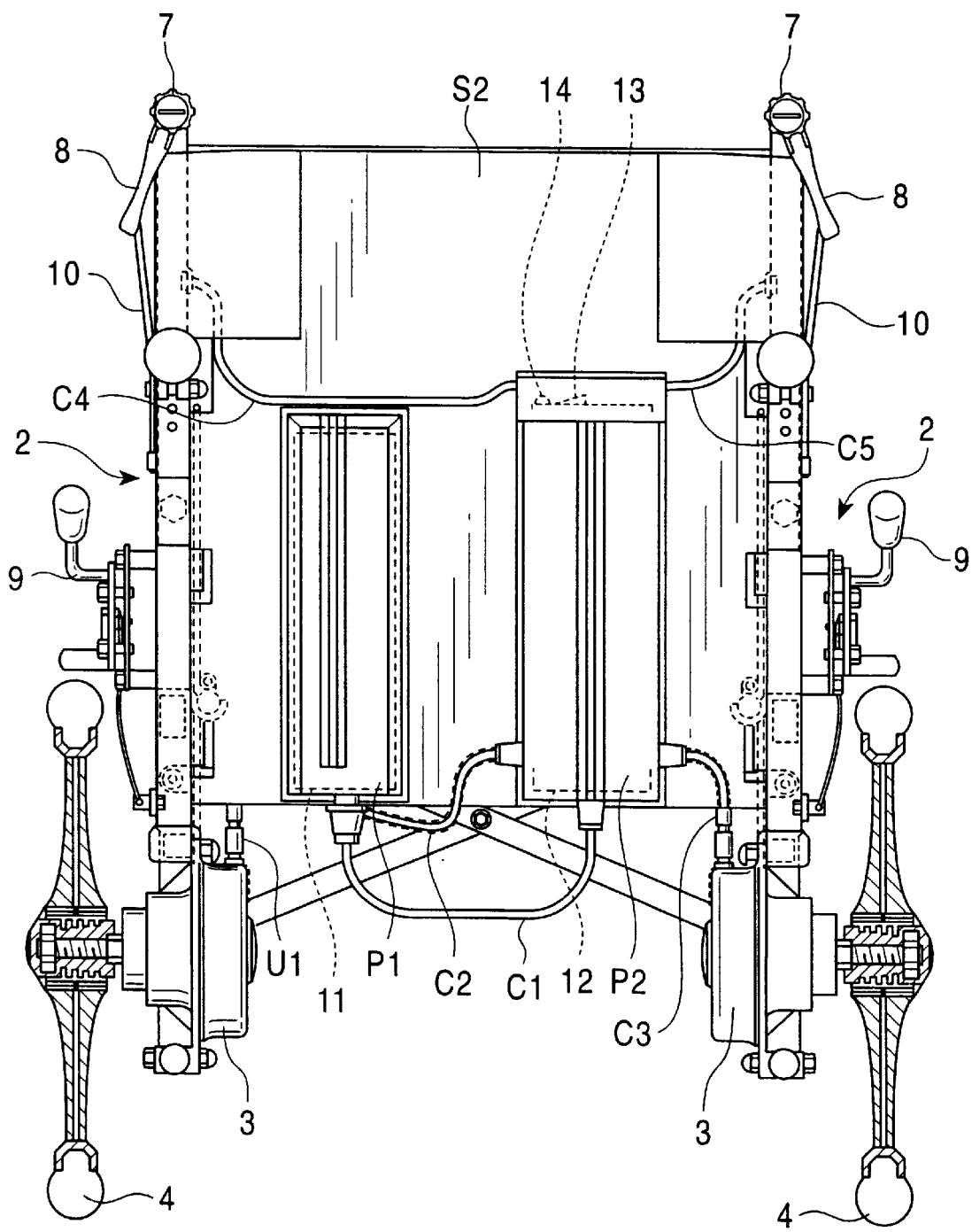
FIG. 14 is a rear view of the electric wheelchair in which the control apparatus is mounted.

FIGS. 13 and 14 are side and rear views, respectively, of an electric wheelchair in which a control apparatus according to a first embodiment of the present invention is mounted. With reference to FIGS. 13 and 14, a main body 1 of the electric wheelchair includes frames 2, each of which is constructed of a plurality of pipe members, and a pair of driving units 3, which are disposed at the right and left sides of the vehicle. Each of the driving units 3 includes a motor and a speed reduction mechanism. A pair of driving wheels 4 (only the contour thereof is shown in FIG. 13) are individually attached to the driving units 3, and a pair of casters 5 are attached to the main body 1 at the front region thereof. Armrests 6 are attached to the frames 2 disposed at the right and left sides of the main body 1. A seat S1 and a backrest S2 (FIG. 14) are tightly stretched between the frames 2, and the backrest S2 is provided with a battery pocket P1 and a control unit pocket P2 at the rear side thereof.

The main body 1 is also provided with operation members (grips) 7 which extend approximately horizontally at the upper rear region thereof, and brake levers 8 are individually disposed below the operation members 7. Each of the operation members 7 contains an operation force detection unit such as a potentiometer, so that the operation force applied by a caregiver who pushes and pulls the electric wheelchair can be detected. Instead of the potentiometer, a bridge circuit including a strain gauge may also be used. In addition, when the electric wheelchair is of the type which provides battery assistance even when the caregiver is absent, each of the handrims (not shown) of the driving wheels 4 is also provided with an operation force detection unit which detects the operation force applied by the occupant.

The brake levers 8 are individually connected to other brake levers 9 via wires 10, and the brakes are mechanically applied to the driving wheels 4 whenever the brake levers 8 or the brake levers 9 is operated.

As shown in FIG. 14, a battery 11 is contained in the battery pocket P1, and a control unit 12 is contained in the control unit pocket P2. The battery 11 and the control unit 12 are connected to each other by a cable C1, and the control unit 12 is connected to the driving units 3 by cables C2 and C3 and to the operation members 7 by cables C4 and C5.

Figure 1:
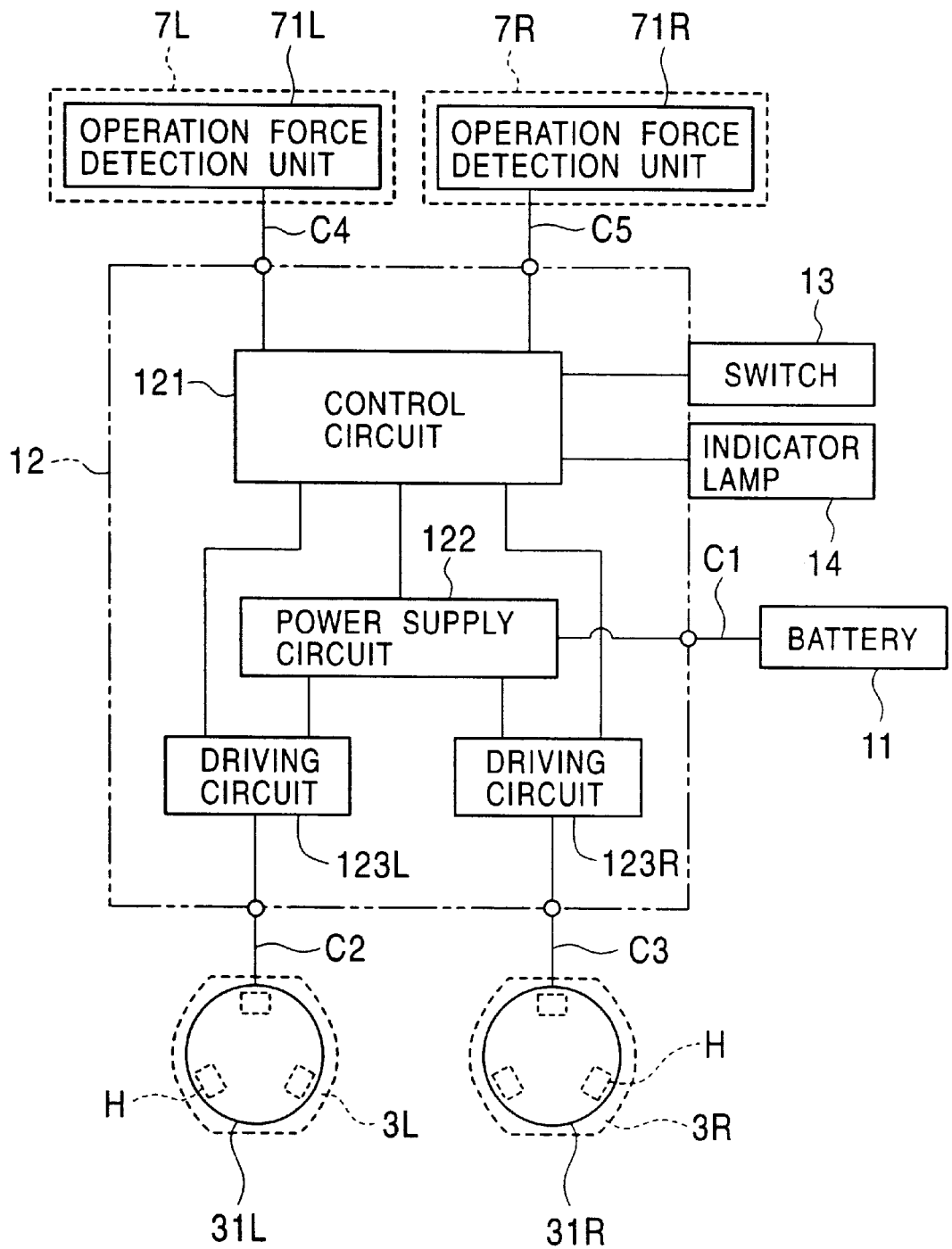
FIG. 1 is a circuit diagram of a control apparatus for an electric vehicle according to a first embodiment of the present invention.

FIG. 1 is a connection diagram of the electric circuit of the control apparatus according to the first embodiment. Members disposed at the right side of the main body 1 are denoted by reference characters including "R" at the end, and members disposed at the left side of the main body 1 are denoted by reference characters including "L" at the end. Driving units 3R and 3L contain motors 31R and 31L, respectively, which are also denoted by 31 when they are generically described. In addition, operation members 7R and 7L contain operation force detection units 71R and 71L, respectively.

As shown in FIG. 1, a switch 13 and an indicator lamp 14 are provided on the exterior surface of a housing of the control unit 12 (see also FIG. 14). The cables C1 to C5 shown in FIG. 1 correspond to those shown in FIG. 14.

The control unit 12 includes a control circuit 121, a power supply circuit 122, and driving circuits 123R and 123L, which are connected to one another. The battery 11 supplies the power supply circuit 122 with DC voltage, and the power supply circuit 122 supplies the control circuit 121 and the driving circuits 123R and 123L with a predetermined power supply voltage. The control circuit 121 is connected to the switch 13 and the indicator lamp 14, and when the switch 13 is turned on, the control circuit 121 is activated and the indicator lamp 14 is lit. A soft, transparent cover is disposed on the control unit pocket P2 (FIG. 14), so that the switch 13 can be operated and the indicator lamp 14 can be observed with the cover in between.

Each of the driving circuits 123R and 123L includes, for example, a bridge circuit including semiconductor switching elements. The driving circuits 123R and 123L switch the DC voltages supplied from the power supply circuit 122 based on PWM signals supplied from the control circuit 121, and drive the motors 31R and 31L, respectively. When the electric brake is to be activated, the driving circuits 123R and 123L stop supplying the voltage to the motors 31R and 31L, respectively, while they are being rotated. Then, the driving circuits 123R and 123L short-circuit winding terminals when the PWM signals are at a high level, and open them when the PWM signals are at a low level. Accordingly, the electric brake is activated by the motors 31R and 31L in accordance with the duty rate of the PWM signals.

The control circuit 121 includes a CPU, a memory, an A/D converter, etc. The control circuit 121 converts operation force signals, which represent the operation forces obtained by the operation force detection units 71R and 71L, to digital values, and performs predetermined processes. The operation force detection units 71R and 71L individually detect the operation forces applied by the caregiver who pushes and pulls the electric wheelchair, and generate the operation force signals. More specifically, the operation force detection units 71R and 71L define the neutral positions of the operation members 7R and 7L, respectively, as the base positions thereof. When the operation forces are applied to the operation members 7R and 7L in the forward or reverse direction, the operation force detection units 71R and 71L change the output values thereof in accordance with the applied operation forces. For example, when the operation forces are not applied to the operation members 7R and 7L and the operation members 7R and 7L are at the neutral positions thereof, the operation force signals are maintained at a predetermined value (normally, 0). When the operation forces are applied to the operation members 7R and 7L in the forward direction, the voltages of the operation force signals are increased from the predetermined value by an amount corresponding to the applied operation forces. When the operation forces are applied to the operation members 7R and 7L in the reverse direction, the voltages of the operation force signals are reduced from the above-described predetermined value by an amount corresponding to the applied operation forces.

The control circuit 121 and the operation force detection units 71R and 71L serve to determine operation force detection signals. The operation force detection signals are obtained by subtracting the above-described predetermined value from the operation force signals, which vary as described above. The driving and braking operations of the motors 31R and 31L are performed based on the operation force detection signals.

The operation forces applied to the operation members 7R and 7L are also transmitted to the driving wheels 4 (FIGS. 13 and 14) via the main body 1, and are directly utilized as the driving force by manpower independently of the driving force applied by the motors 31R and 31L.

Each of the motors 31R and 31L is a three-phase brushless motor including a stator in which three Hall elements H are installed (FIG. 1). The Hall elements H output pulses in accordance with the rotation of a rotor, and the pulses are transmitted to the control circuit 121 via the corresponding driving circuit 123R or 123L. The control circuit 121 determines the rotational speeds of the motors 31R and 31L, that is, the speed of the electric wheelchair, by counting the number of pulses per unit of time. In addition, the control circuit 121 and the Hall elements H also serve to determine the rotational directions of the motors 31R and 31L, that is, the rotational directions of the driving wheels 4, based on the phases of the pulses output by the Hall elements H.

Instead of using the Hall elements H, the rotational speeds may also be determined by providing speed sensors such as tachometer generators, etc., to the motors 31R and 31L, or to the driving wheels 4. In such a case, the rotational speeds are determined by the output voltages of the tachometer generators and the rotational directions are determined by the polarities of the output voltages.

Next, the operation of the control circuit 121 will be described below.

Figure 2:
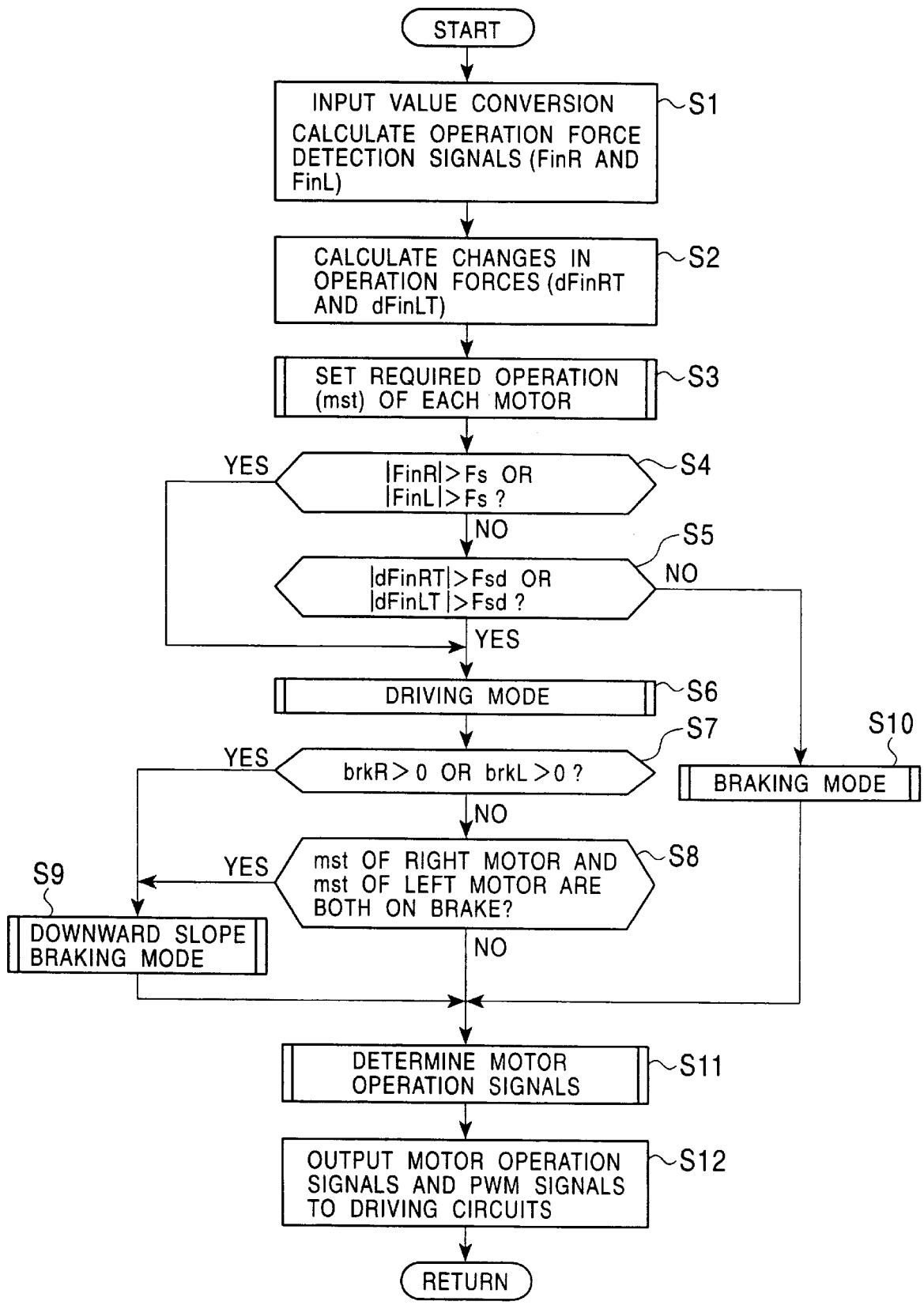
FIG. 2 is a flowchart of the operation of the control circuit of the control apparatus.
Figure 10:
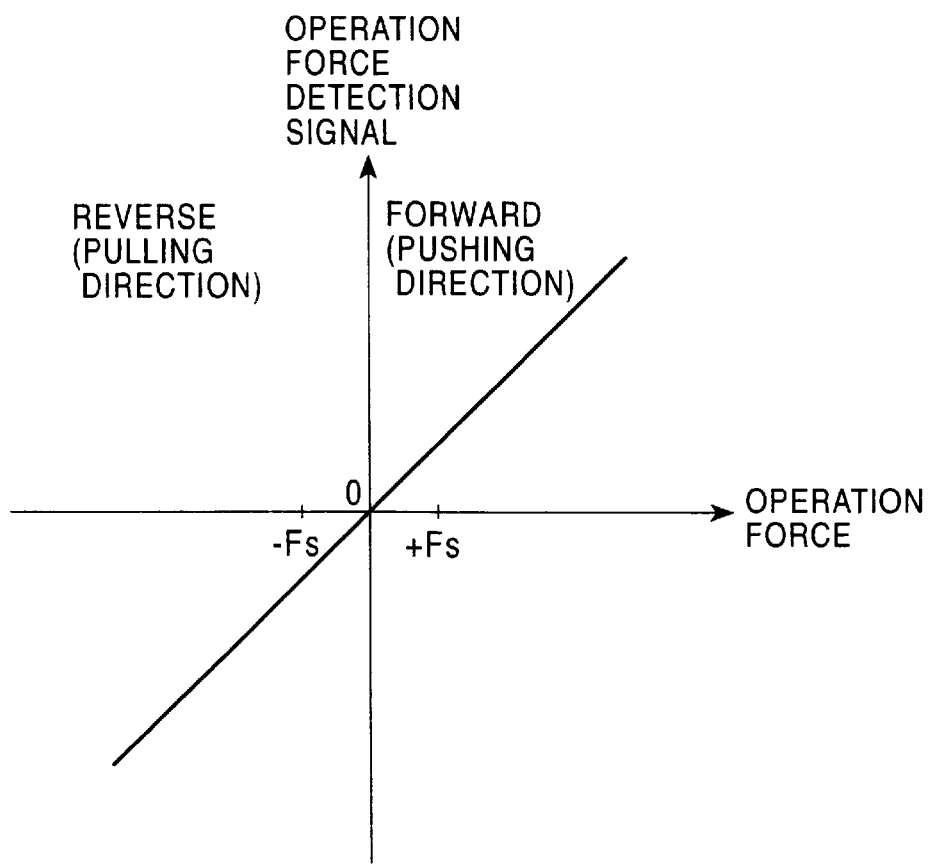
FIG. 10 is a graph showing the relationship between the operation force and the operation force detection signal in the control apparatus.

FIG. 2 is a flowchart showing a routine for driving or braking the motor implemented by the CPU of the control circuit 121 (hereinafter referred to merely as CPU). This routine is included in a main routine (not shown), and is repeated at high speed. First, at S1, the CPU subtracts the operation force signals obtained when operation forces are not applied from the operation force signals output from the operation force detection units 71R and 71L in accordance with the applied operation forces (input value conversion). Accordingly, an operation force detection signal FinR corresponding to the operation force detected by the operation force detection unit 71R and an operation force detection signal FinL corresponding to the operation force detected by the operation force detection unit 71L are obtained. FIG. 10 is a graph showing the relationship between the operation force and the operation force detection signal. When the operation force is not applied, the operation force detection signal is 0. When the operation force is applied in the forward direction (pushing direction), the operation force detection signal is increased at a constant rate, and when the operation force is applied in the reverse direction (pulling direction), the operation force detection signal is reduced in the negative region at the same rate. Accordingly, the direction of the operation force (forward or reverse) can be determined based on the sign (negative or positive) of the operation force detection signal, and the amount of the operation force can be determined from the absolute value thereof. In FIG. 10, operation forces +Fs and −Fs are predetermined values, which will be described below.

Next, at S2, the CPU calculates the changes in the operation forces by the following processes. First, when the cycle number is t, the difference between FinR(t) obtained at S1 in the current cycle and FinR(t−1) obtained in the previous cycle and the difference between FinL(t) obtained in the current cycle and FinL(t−1) obtained in the previous cycle are calculated as follows:

$$dFinR(t)=FinR(t)-FinR(t-1) \quad (1)$$

$$dFinL(t)=FinL(t)-FinL(t-1) \quad (2)$$

Then, the changes in the operation forces dFinRT and dFinLT are determined based on the results of the above-described calculations as follows:

$$dFinRT=\{dFinR(t)+dFinRT(t-1)\}/2 \quad (3)$$

$$dFinLT=\{dFinL(t)+dFinLT(t-1)\}/2 \quad (4)$$

Figure 3:
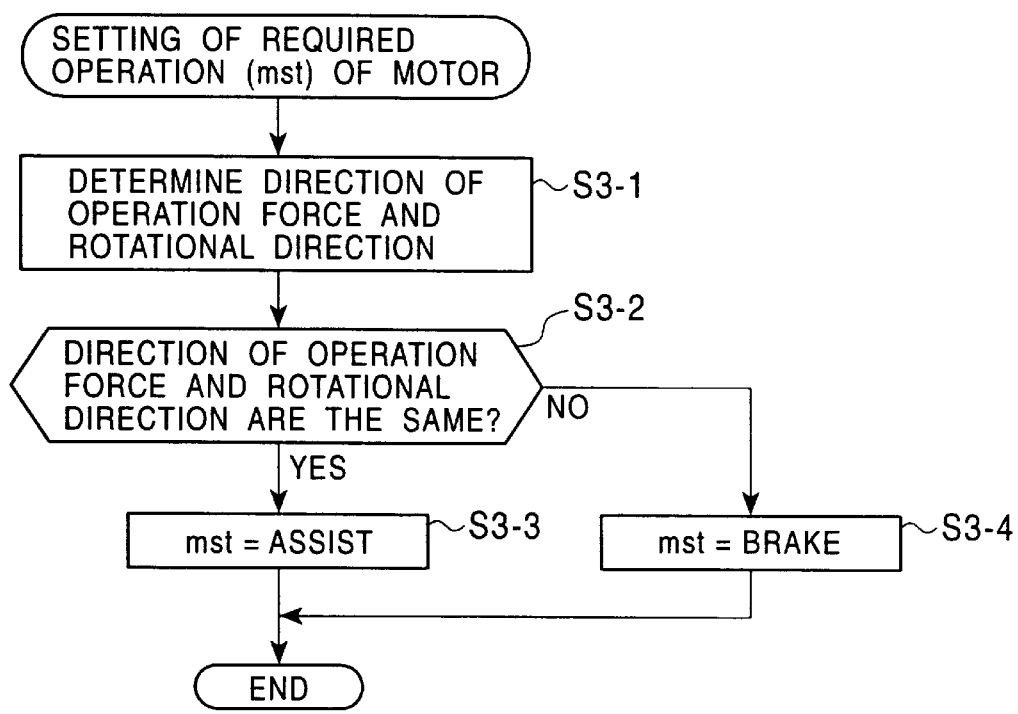
FIG. 3 is a flowchart of the operation performed at S3 in the flowchart shown in FIG. 2.

Next, the CPU sets the required operation (hereinafter denoted by mst) for each motor at S3. FIG. 3 is a flowchart of a subroutine implemented at S3. This subroutine is implemented for each of the operation force detection units 71R and 71L and the right and left driving wheels 4 corresponding thereto.

First, at S3-1, the CPU determines the direction of the operation force based on the operation force detection signal (FinR or FinL). In addition, the CPU also determines the rotational direction of the corresponding driving wheel 4 based on the outputs of the Hall elements H. Next, at S32, the CPU determines whether or not the direction of the operation force and the rotational direction of the corresponding driving wheel 4 are the same. When the result is YES, the CPU sets mst to "assist" at S3-3, and when the result is NO, the CPU sets mst to "brake" at S3-4. Accordingly, mst is individually set for each of the right and left driving wheels 4.

Then, at S4 in FIG. 2, the CPU determines whether or not the absolute value of at least one of the operation force detection signals FinR and FinL is larger than the above-described predetermined value Fs. When the result is YES, that is, when the absolute value of at least one of the operation force detection signals FinR and FinL exceeds the predetermined value Fs, the CPU jumps to S6 (driving mode). When the result is NO, the CPU proceeds to S5 and determines whether or not the absolute value of at least one of the changes in the operation force detection signals dFinR and dFinL is larger than another predetermined value Fsd (<<Fs). This step (S5) is implemented in order to determine whether or not at least one hand of the operator (caregiver) is off the electric wheelchair. When the result of this step is YES, it is determined that the operator is operating the electric wheelchair, and the CPU jumps to S6 (driving mode). When the result of this step is NO, it is determined that at least one hand of the operator is off the electric wheelchair, and the CPU jumps to S10 (braking mode). In the braking mode operation, an electrical braking force is increased from 0 to the maximum amount. Accordingly, when the operator takes his or her hands off the operation members 7R and 7L, the maximum amount of electrical braking force is generated, and the vehicle is rapidly decelerated.

Figure 4:
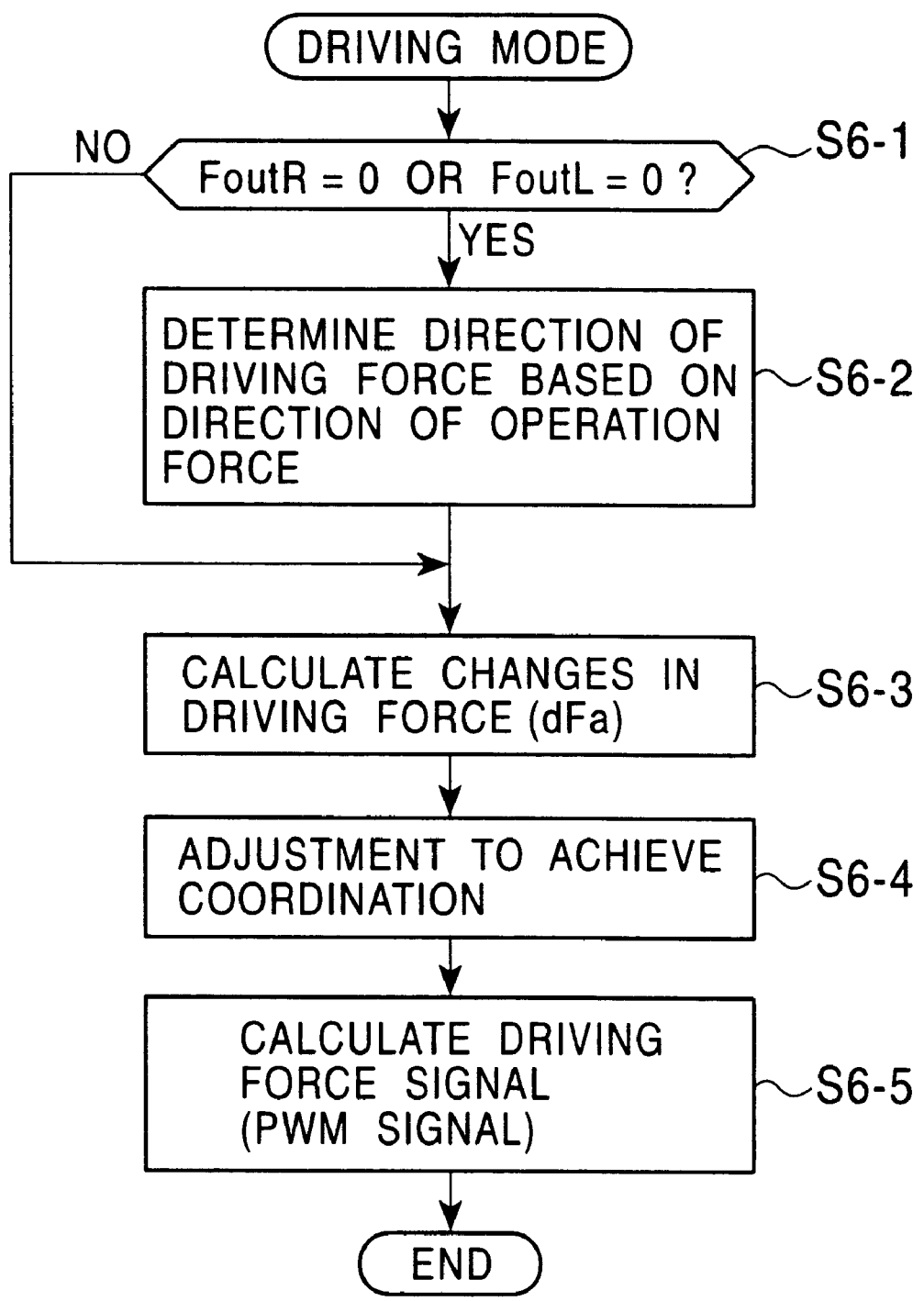
FIG. 4 is a flowchart of the operation performed at S6 in the flowchart shown in FIG. 2.

FIG. 4 is a flowchart of a subroutine implemented at S6 (driving mode). This subroutine is implemented for each of the right and left driving wheels 4. As shown in FIG. 4, the CPU first determines whether or not at least one of FoutR=0 and FoutL=0, wherein FoutR and FoutL are driving force signals transmitted from the control circuit 121 to the driving circuits 123R and 123L, respectively, is satisfied at S6-1. The driving force signals FoutR and FoutL correspond to the driving forces generated by the motors 31R and 31L, respectively. When both of these equations are not satisfied, the driving force signals FoutR and FoutL which are not 0 are already output. Since the directions of the driving forces are already determined in such a case, the CPU jumps to S6-3. When at least one of the driving force signals FoutR and FoutL is 0, the CPU jumps to S6-2. At S6-2, with respect to the side at which the driving force signal (FoutR or FoutL) is 0, the CPU determines the rotational direction (forward or reverse) of the corresponding motor (31R or 31L) based on the sign (negative or positive) of the corresponding operation force detection signal (FinR or FinL). In the initial stage of the driving mode operation, the rotational direction (forward or reverse) is determined for each of the motors 31R and 31L.

Then, the CPU calculates the change in the driving force dFa of each of the motors 31R and 31L at S6-3. The change in the driving force dFa is defined as the change in a driving force signal Fa, which determines the driving force generated by the corresponding motor 31. When the cycle number in the flowchart shown in FIG. 2 is t, the driving force signal Fa can be expressed as follows:

$$Fa(t)=Fa(t-1)+dFa \quad (5)$$

Accordingly, the driving force signal Fa is expressed as the accumulation of the change in the driving force dFa. Thus, the driving force signal Fa is increased when the change in the driving force dFa is positive, and is reduced when the change in the driving force dFa is negative. In addition, the direction of the driving force of the corresponding motor 31 is forward when the driving force signal Fa is positive and reverse when the driving force signal Fa is negative.

Although the above-described driving force signal Fa is not output because an adjustment which will be described below is performed at the subsequent step (S6-4), it can be considered as the basic command signal for generating the driving force.

The change in the driving force dFa can be obtained by, for example, multiplying the proportional element dFap by a coefficient k.

$$dFa=k \cdot dFap \quad (6)$$

Figure 11:
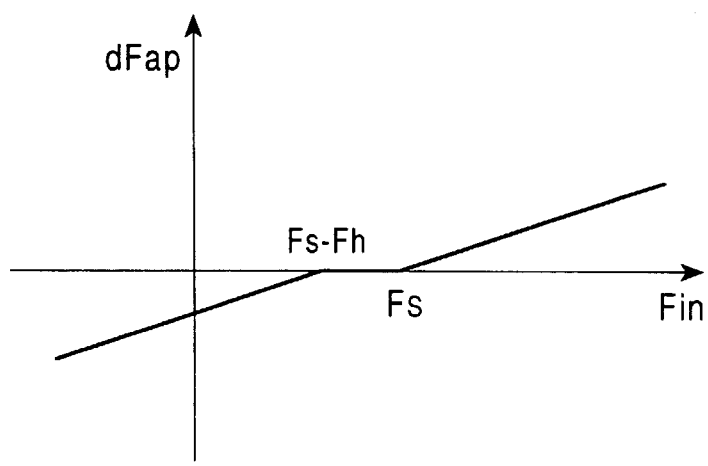
FIG. 11 is a graph showing the relationship between the operation force detection signal Fin and the change in the operation force dFap.

The proportional element dFap of the change in the driving force can be determined based on, for example, the function as shown in FIG. 11. The function shown in FIG. 11 can be expressed as follows:

When Fin>Fs, $$dFap=KDFAP\_H \cdot (Fin-Fs) \quad (7)$$

When Fs−Fh≦Fin≦Fs, $$dFap=0 \quad (8)$$

When Fin<Fs−Fh, $$dFap=KDFAP\_L \cdot (Fin-(Fs-Fh)) \quad (9)$$

wherein Fs and Fh are predetermined values, and KDFAP_H and KDFAP_L are predetermined constant values.

Figure 5:
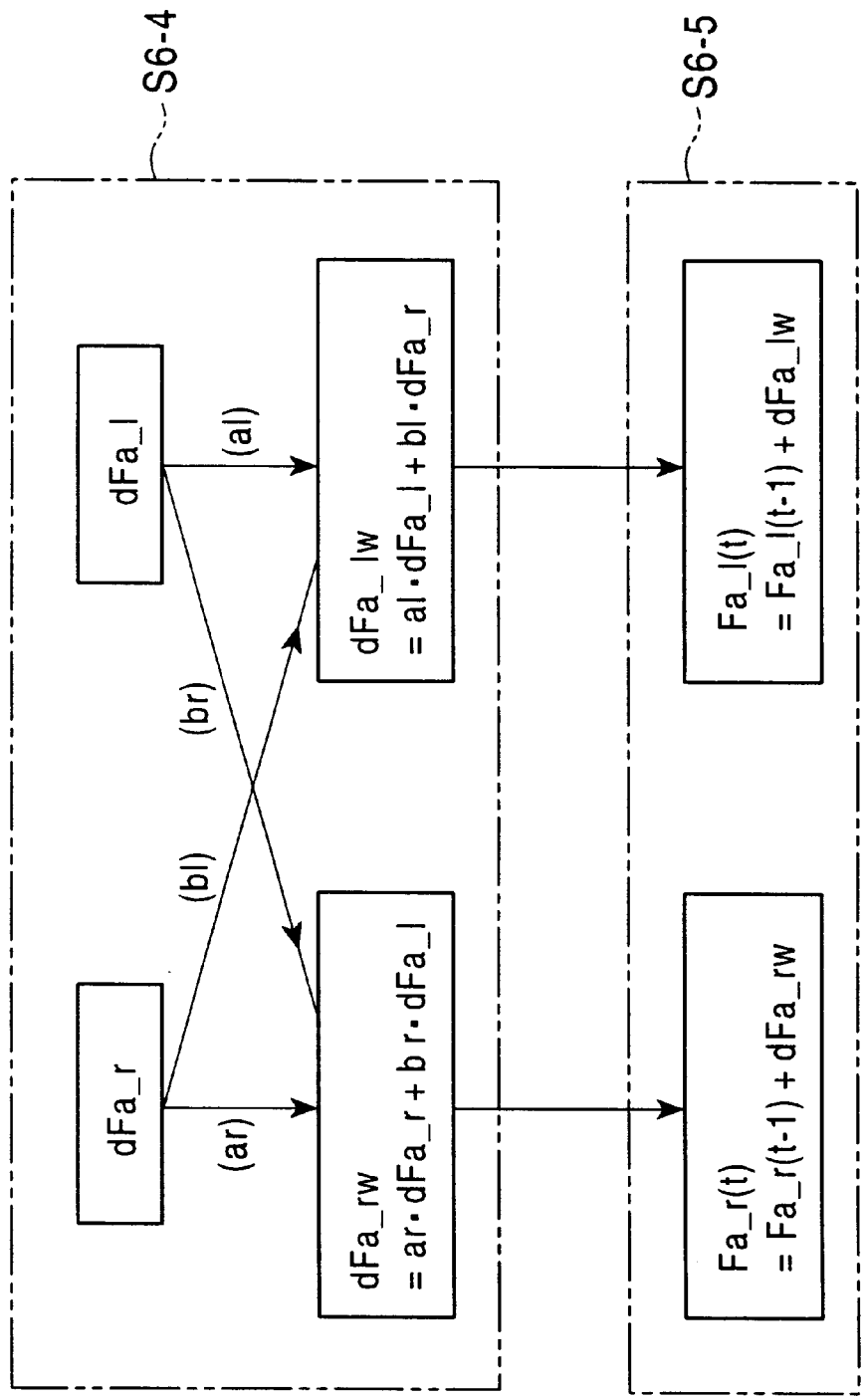
FIG. 5 is a flowchart of the operation performed at S64 and S6-5 in the flowchart shown in FIG. 4.

Then, at S6-4, the CPU performs an adjustment to achieve the coordination between the right and the left driving forces. The adjustment to achieve coordination between the right and the left driving forces is a known technique for stabilizing the linear movement of the vehicle. FIG. 5 is a diagram showing the relationship between the adjustment to achieve coordination performed at S6-4 and the calculation of the driving force signals performed at the subsequent step (S6-5). With reference to FIG. 5, ar, bl, br and al are predetermined adjustment factors (positive value between 0 and 1) which are input to the control circuit 121 (FIG. 1) in advance. Adjusted changes in the driving forces dFa_rw and dFa_lw for the right and left motors 31R and 31L, respectively, are determined based on the changes in the driving forces dFa_r and dFa_l, respectively, and the above-described adjustment factors. More specifically, the adjusted change in the driving force dFa_rw is determined as the sum of the multiplication of the change in the driving force dFa_r and the adjustment factor ar and the multiplication of the change in the driving force dFa_l and the adjustment factor br. Similarly, the adjusted change in the driving force dFa_lw is determined as the sum of the multiplication of the change in the driving force dFa_l and the adjustment factor al and the multiplication of the change in the driving force dFa_r and the adjustment factor bl.

At S6-5 (FIG. 5), the driving force signal for the right motor 31R at the current cycle Fa_r(t) is calculated as the sum of the driving force signal at the previous cycle Fa_r (t−1) and the adjusted change in the driving force Fa_rw. Similarly, the driving force signal for the left motor 31L at the current cycle Fa_l(t) is calculated as the sum of the driving force signal at the previous cycle Fa_l(t−1) and the adjusted change in the driving force Fa_lw.

Lastly, the CPU converts the driving force signals Fa_r(t) and Fa_l(t) to PWM signals, and transmits them to the driving circuits 123R and 123L (FIG. 1) as the driving force signals FoutR and FoutL (S6-5 in FIG. 4). Then, the motors 31R and 31L are driven based on the driving force signals FoutR and FoutL.

Then, with reference to FIG. 2, at S7, the CPU determines whether or not at least one of brkR>0 and brkL>0, wherein brkR and brkL are electrical braking forces, is satisfied. When the result of the determination is YES, that is, when the electrical braking force brkR or brkL is already generated, the CPU jumps to step S9. When the result of the determination is NO, the CPU proceeds to S8. Initially, neither one of the electrical braking forces brkR and brkL is applied, so that the CPU proceeds to S8. At S8, the CPU determines whether or not mst of the right motor 31R and mst of the left motor 31L are both on "brake". When the result is YES, the CPU proceeds to S9. When the result of this determination is NO, two cases can be considered: a case in which mst of the right motor 31R and mst of the left motor 31L are both on "assist", and a case in which mst of one of the right and left motors 31R and 31L is on "assist" and mst of the other motor is on "brake". In the former case, it is of course not necessary to implement a downward slope braking mode operation at S9, so that the CPU proceeds to S11. The latter case means that the vehicle is trying to turn around. Thus, if the electrical braking force is applied to one of the driving wheels in the reverse direction, it is dangerous since there is a risk that the vehicle will be turned around too sharply. Accordingly, in such a case, the downward slope braking mode operation is not implemented, and the CPU proceeds to S11.

Figure 6:
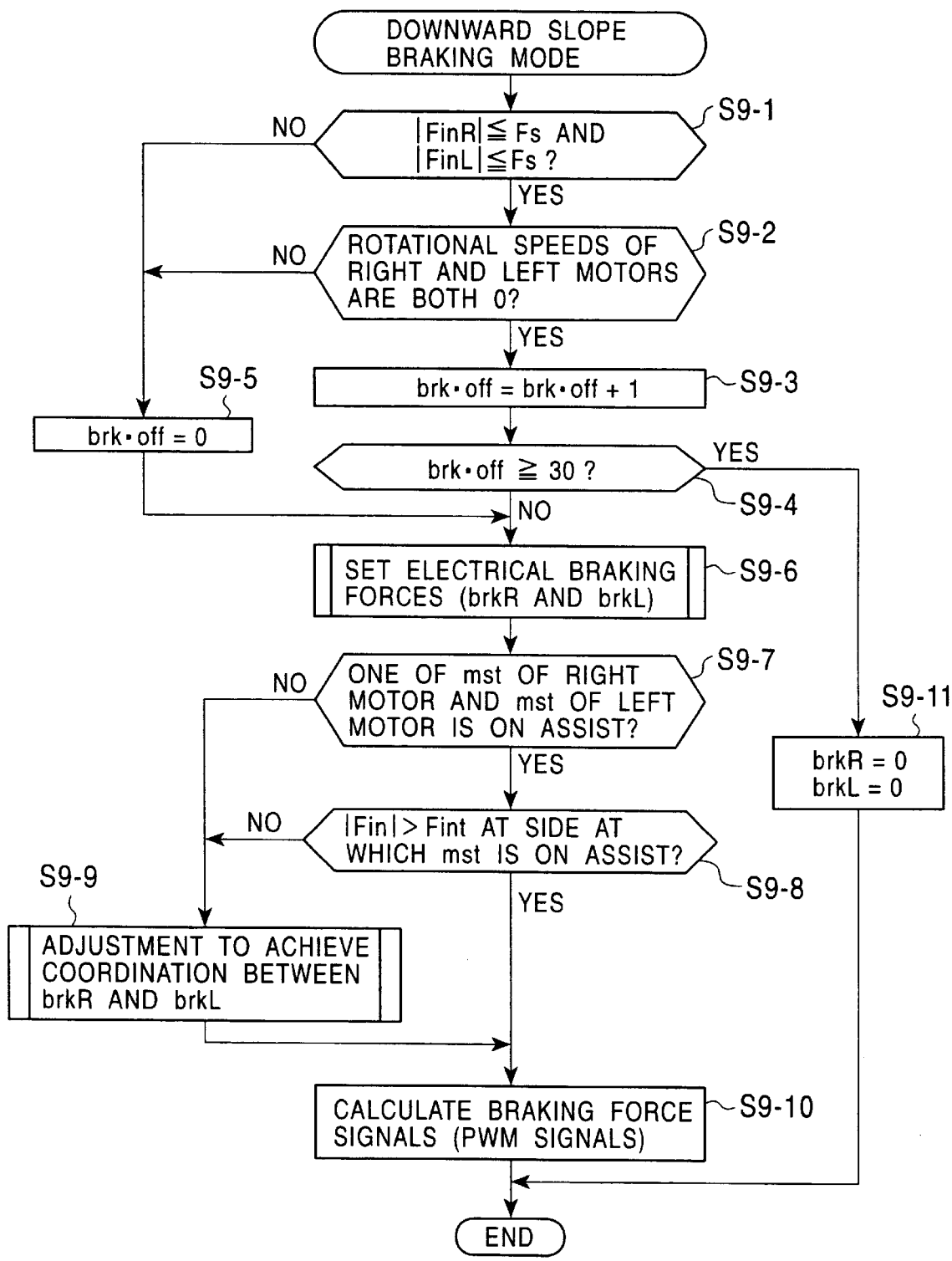
FIG. 6 is a flowchart of the operation performed at S9 in the flowchart shown in FIG. 2.
Figure 7:
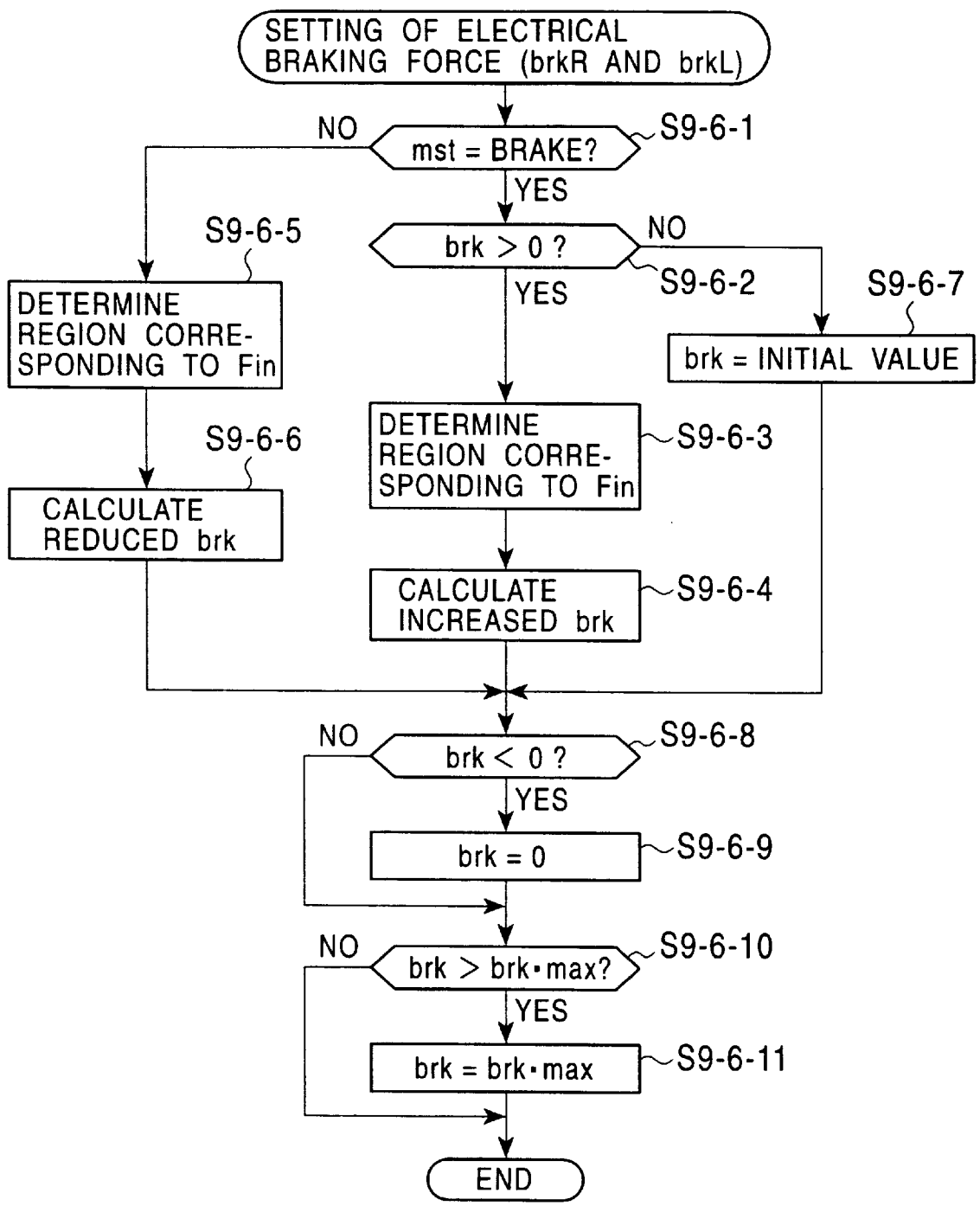
FIG. 7 is a flowchart of the operation performed at S96 in the flowchart shown in FIG. 6.
Figure 8:
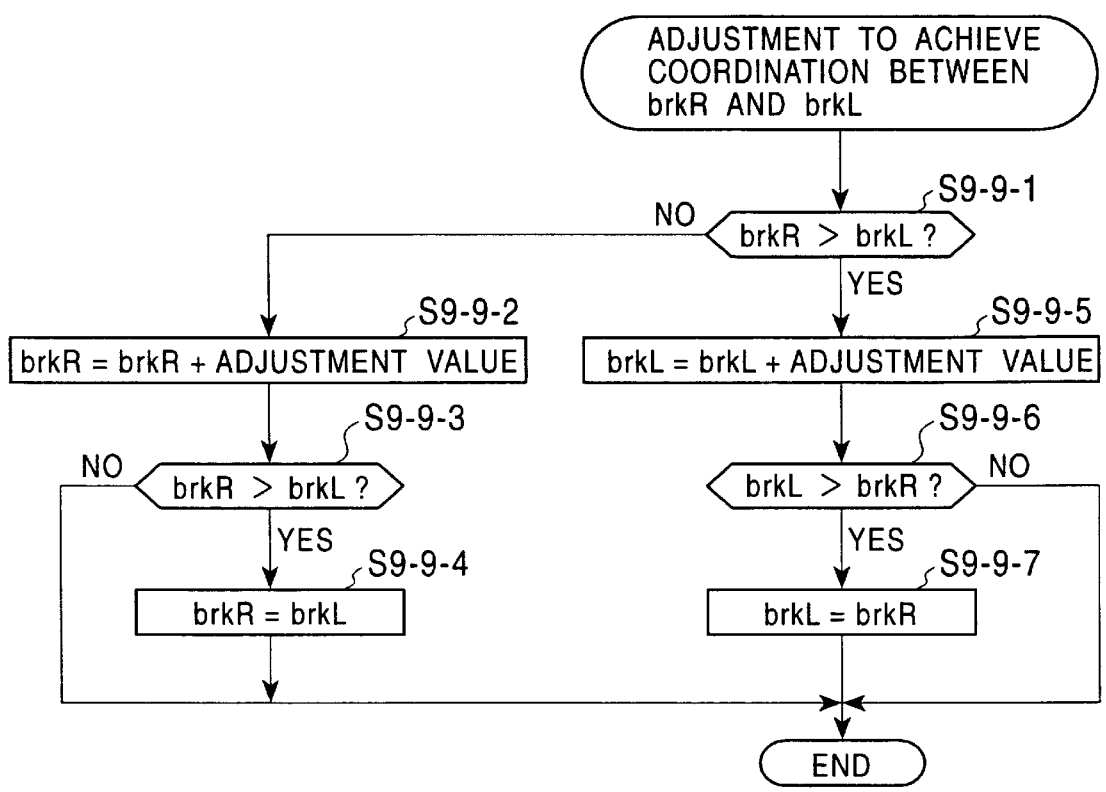
FIG. 8 is a flowchart of the operation performed at S99 in the flowchart shown in FIG. 6.

The downward slope braking operation will be further illustrated with reference to the subroutine shown in FIG. 6. In FIG. 6, another subroutine shown in FIG. 7 is implemented at S9-6, and still another subroutine shown in FIG. 8 is implemented at S9-9.

With reference to FIG. 6, at S9-1, the CPU determines whether or not |FinR|≦Fs and |FinL|≦Fs, wherein FinR and FinL are operation force detection signals, are satisfied. When the result of the determination is YES, the CPU proceeds to S9-2, and determines whether or not the rotational speeds of the right and left driving wheels 4 (or of the motors 31) are both 0. When either one of the results of S9-1 and S9-2 is NO, the CPU proceeds to S9-5 and sets a counter brk·off to 0, and then proceeds to S9-6.

When the result of the determination is YES at S9-2, that is, when the vehicle is stationary, the CPU adds 1 to brk·off at S9-3. Then, the CPU determines whether or not brk·off is 30 or more at S9-4. When the result is YES, the CPU sets brkR=0 and brkL=0 at S9-11 and ends this routine. When the result is NO, the CPU proceeds to S9-6. Accordingly, when the vehicle stays stationary until brk·off is increased to 30 in this routine, the electrical braking force is set to 0. Thus, when the vehicle is stopped and then restarted, the electrical braking forces brkR and brkL are removed and the vehicle can be easily moved again.

Then, after the electrical braking forces are set at S9-6 as described in detail in the following descriptions, the CPU determines whether or not one of mst of the right motor 31R and mst of the left motor 31L is on "assist" at S9-7. When the result of the determination is NO, the CPU proceeds to S9-9, and performs an adjustment to achieve coordination between brkR and brkL. When the result of the determination is YES, the CPU proceeds to S9-8, and determines whether or not |Fin|>Fint, wherein Fint is a predetermined value, is satisfied at the side at which mst is on "assist". When the result of the determination is NO, the CPU proceeds to S9-9. After S9-9 is implemented, the CPU calculates the braking force signals (PWM signals) at S9-10, and ends this routine. When the result of the determination is YES at S9-8, that is, when one of mst of the right motor 31R and mst of the left motor 31L is on "assist" and the corresponding operation force is larger than the predetermined value Fint, the vehicle tries to turn around while the electric braking force is generated. In such a case, the electrical braking force at the side at which mst is on "assist" should gradually be reduced. Accordingly, it is not preferable to perform the adjustment to achieve coordination between brkR and brkL. Accordingly, when the result of the determination is YES at S9-8, the CPU proceeds to S9-10 without implementing S9-9, and then ends this routine.

The subroutines implemented at S9-6 and S9-9 in FIG. 6 will be explained below with reference to FIGS. 7 and 8. FIG. 7 is a flowchart of the subroutine for setting the electrical braking forces (S9-6 in FIG. 6). This subroutine is also implemented for each of the right and left driving wheels 4. First, at S9-6-1, the CPU determines whether or not mst is on "brake". When the result is YES, the CPU determines whether or not brk>0 is satisfied at S9-6-2. When brk>0 is satisfied, the CPU determines the region corresponding to the operation force detection signal Fin (FinR or FinL), based on information shown in the graph in FIG. 12A.

Figure 12A:
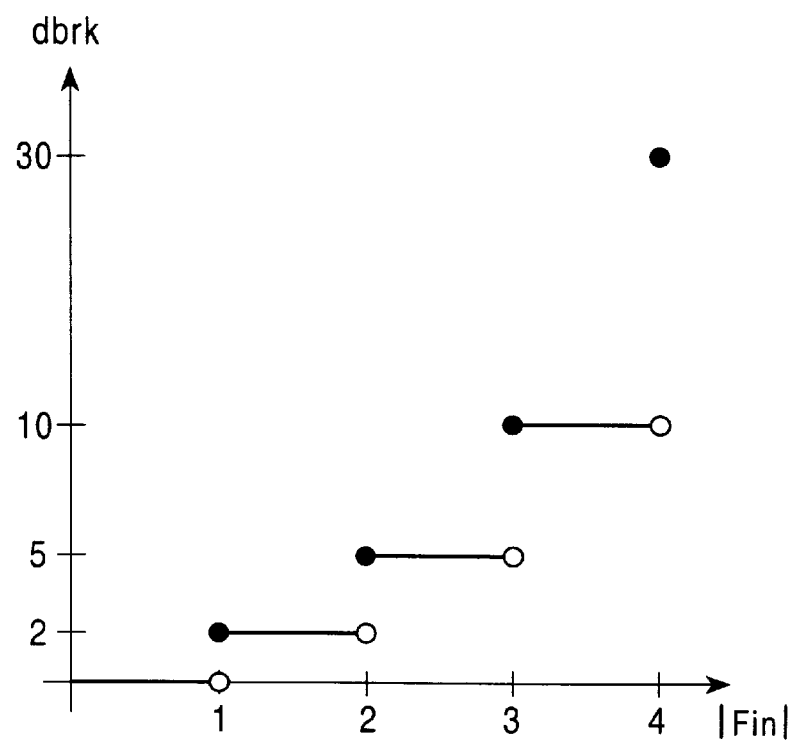
FIGS. 12A and 12B are graphs showing the relationship between the absolute value of the operation force detection signal Fin and the change in the braking force dbrk, where

With reference to FIG. 12A, the horizontal axis shows the absolute value of the operation force detection signal Fin, and the vertical axis shows the change in the electrical braking force dbrk. For example, when 0≦|Fin|<1, the change in the electrical braking force is 0, when 1≦|Fin|>2, the change in the electrical braking force is 2, and when 2≦|Fin|<3, the change in the electrical braking force is 5. Accordingly, the change in the electrical braking force is determined. When 4≦|Fin|, the change in the electrical braking force is 30. From the macro point of view, the relationship between the operation force detection signal Fin and the change in the electrical braking force dbrk is quadratic, and the change in the electrical braking force dbrk increases in accelerating manner relative to the operation force detection signal Fin. Thus, the electrical braking force brk quickly responds to the operation force. In addition, the change in the electrical braking force dbrk is 0 in the case of 0≦|Fin|<1. Accordingly, the electrical brake is prevented from responding too sensitively when a small operation force, which does not always respond to the operators intention, is applied.

Next, at S9-6-4 (FIG. 7), the CPU calculates the electrical braking force brk based on the change in the electrical braking force dbrk, which is positive shown as in FIG. 12A. Thus, the electrical braking force brk increases accumulatively.

Figure 12B:
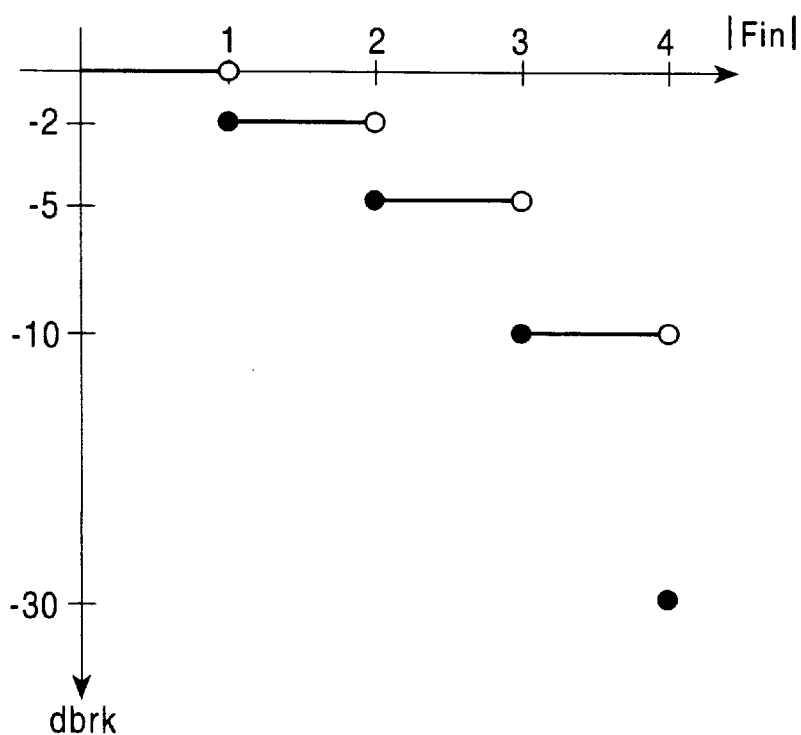

When mst is not on "brake", that is, when mst is on "assist" at S9-6-1, the CPU determines the region corresponding to the operation force detection signal Fin based on information shown in the graph shown in FIG. 12A at S9-6-5, and then calculates the electric braking force brk at S9-6-6. In FIG. 12B, the sign of the change in the electrical braking force dbrk is opposite to that in FIG. 12A. Thus, as the operation force is increased, the change in the electrical braking force dbrk is reduced in the negative region, so that the electrical braking force brk is also reduced. Accordingly, when mst of the motor is on "assist" and the electrical braking force is generated (brk>0), the electrical braking force brk is first gradually reduced. Therefore, the electrical braking force brk is not suddenly set to 0, so that safety is ensured and the movement of the vehicle is adequately controlled.

When the result of the determination is NO at S9-6-2, the CPU sets the electrical braking force brk to the initial value at S9-6-7. Thus, when brk≦0, the electrical braking force brk returns to the initial value, so that the initial electrical braking force is always the same.

Then, at S9-6-8, the CPU determines whether or not brk<0 is satisfied. When the result is NO, the CPU proceeds to S9-6-10, and when the result is YES, the CPU sets brk=0 and then proceeds to S9-6-10. At S9-6-10, the CPU determines whether or not brk>brk·max is satisfied, wherein brk·max is the maximum value of brk. When brk>brk·max is not satisfied, the CPU ends this routine. When brk>brk·max is satisfied, the CPU sets brk to the maximum value brk·max, and then ends this routine.

FIG. 8 is a flowchart of the subroutine of the adjustment to achieve the coordination between the electric braking forces (S9-9 in FIG. 6). First, at step S9-9-1, the CPU determines whether or not brkR>brkL is satisfied. When the result is NO, the CPU proceeds to S9-9-2, and adds an adjustment value to brkR. Then, at S9-9-3, the CPU once again determines whether or not brkR>brkL is satisfied. When the result is NO, the CPU ends this subroutine. When the result is YES, the CPU sets brkR=brkL at S9-9-4, and then ends this subroutine. When the result of the determination is YES at S9-9-1, the CPU proceeds to S9-9-5, and adds an adjustment value to brkL. Then, at S9-9-6, the CPU once again determines whether or not brkL>brkR is satisfied. When the result is NO, the CPU ends this subroutine. When the result is YES, the CPU sets brkR=brkL at S9-9-7, and then ends this subroutine. Due to this subroutine, the smaller one of brkR and brkL is increased stepwise every time the subroutine is implemented until they finally become equal. Thus, the braking forces applied to the right and left driving wheels 4 are adjusted so as to coordinate with each other. Accordingly, the movement of the vehicle is adequately controlled.

Figure 9:
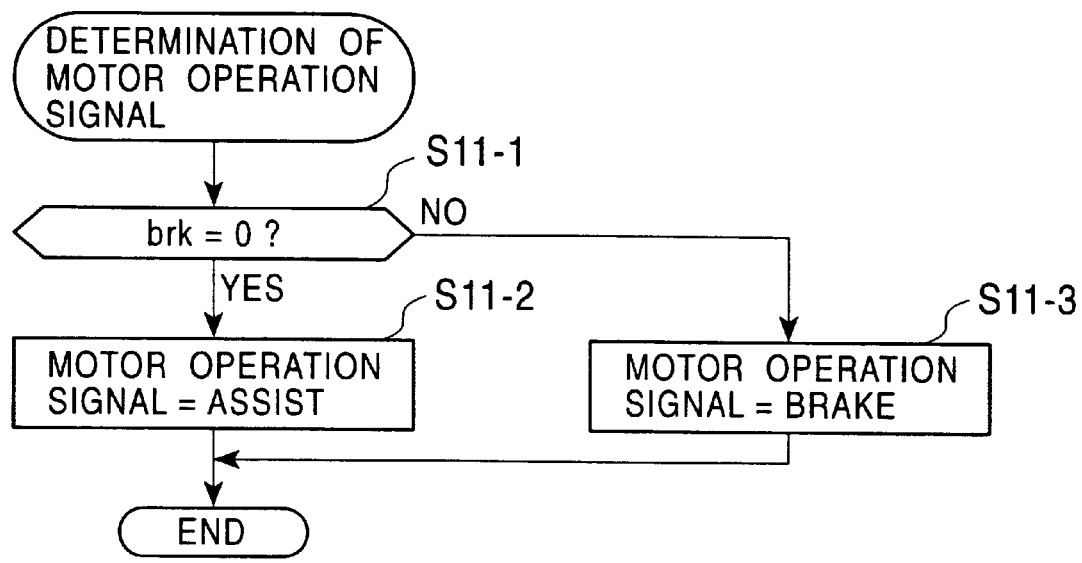
FIG. 9 is a flowchart of the operation performed at S11 in the flowchart shown in FIG. 2.

After the process of the downward slope braking mode operation (S9 in FIG. 2) is finished, the CPU determines motor operation signals at S11 in FIG. 2. FIG. 9 is a flowchart of the subroutine implemented at S11. This subroutine is also implemented for each of the right and left driving wheels 4. First, the CPU determines whether or not brk=0 is satisfied at S11-1. When the result is YES, the CPU sets the motor operation signal to "assist" at S11-2 and ends this subroutine. When the result is NO, the CPU sets the motor operation signal to "brake" at S11-3 and ends this subroutine.

Finally, the CPU proceeds to S12 in FIG. 2, and outputs PMS signals to the driving circuits 123R and 123L in accordance with the above-described motor operation signals. With respect to each of the driving circuits 123R and 123L, the PWM signal of the driving force calculated at S6-5 in FIG. 4 is output when the motor operation signal is on "assist", and the PWM signal of the braking force calculated at S9-10 in FIG. 6 is output when the motor operation signal is on "brake". Accordingly, the driving circuits 123R and 123L drive or brake the motors 31R and 31L, respectively, in accordance with the received PWM signals. When the braking force is generated, the load on the operator is reduced, so that the operator can control the speed of the vehicle without applying a large operation force. Thus, the movement of the vehicle is adequately controlled, and the operability thereof on slopes is increased.

Since the motors for the right and left driving wheels are individually controlled, there may be a case in which the driving force is applied by one motor and the braking force is applied by the other motor (for example, when the vehicle turns around on a downward slope).

In addition, although the above-described "downward slope braking mode" is explained based on a case in which the vehicle moves down a slope in a forward manner, this mode is also applied in a case in which the vehicle moves down a slope in a reverse manner. In such a case, the vehicle tries to move rearward due to gravity while the operation forces are applied in the forward direction. Thus, the rotational direction of the driving wheels and the directions of the operation forces are opposite, so that mst is set to "brake".

Next, a control apparatus for an electric vehicle according to a second embodiment of the present invention will be described with reference to FIGS. 15 to 20. The second embodiment is the same as the first embodiment except for the contents of FIGS. 15 to 20.

Figure 15:
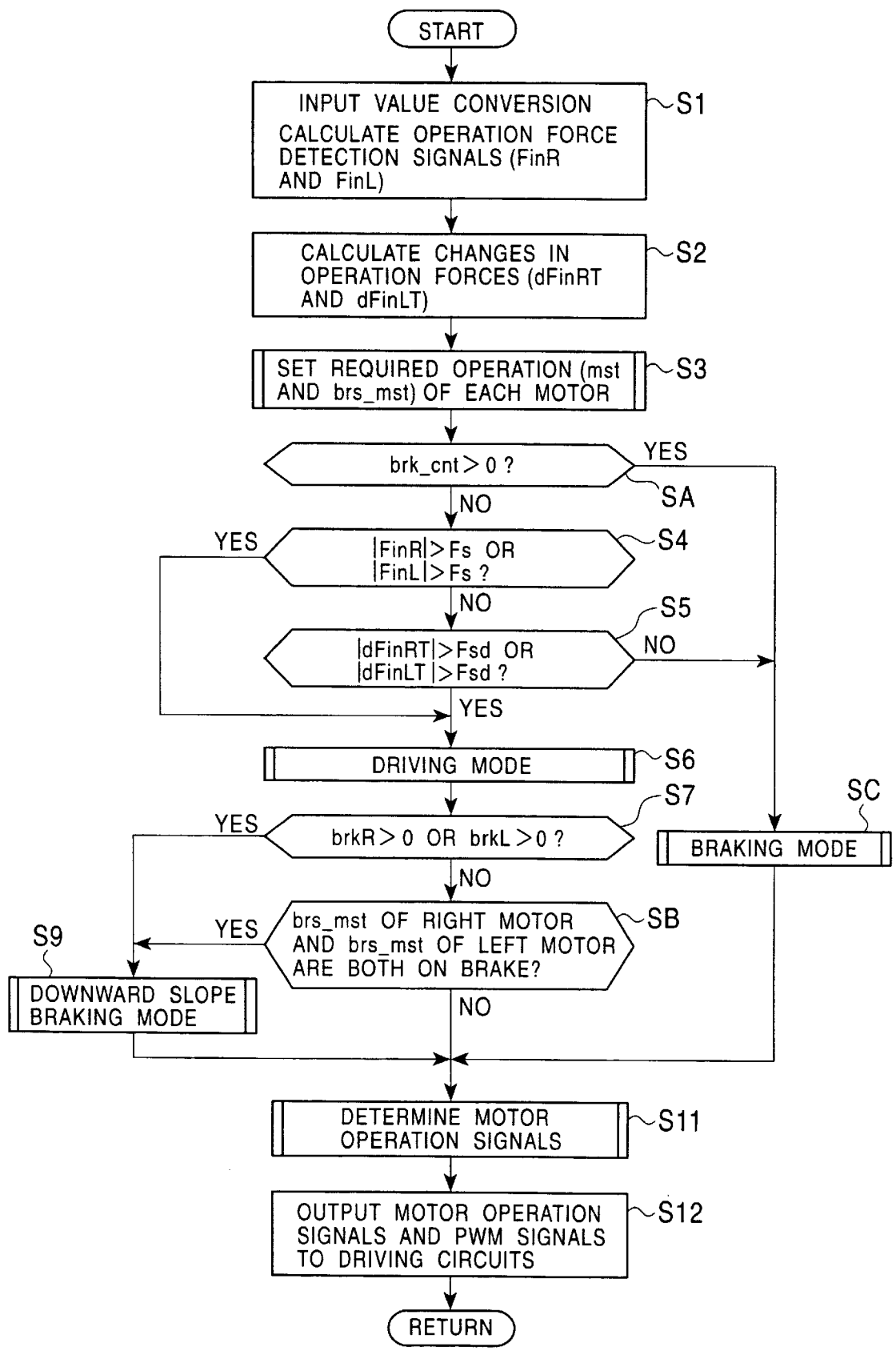
FIG. 15 is a flowchart of the operation of a control circuit of a control apparatus according to a second embodiment of the present invention.
Figure 16:
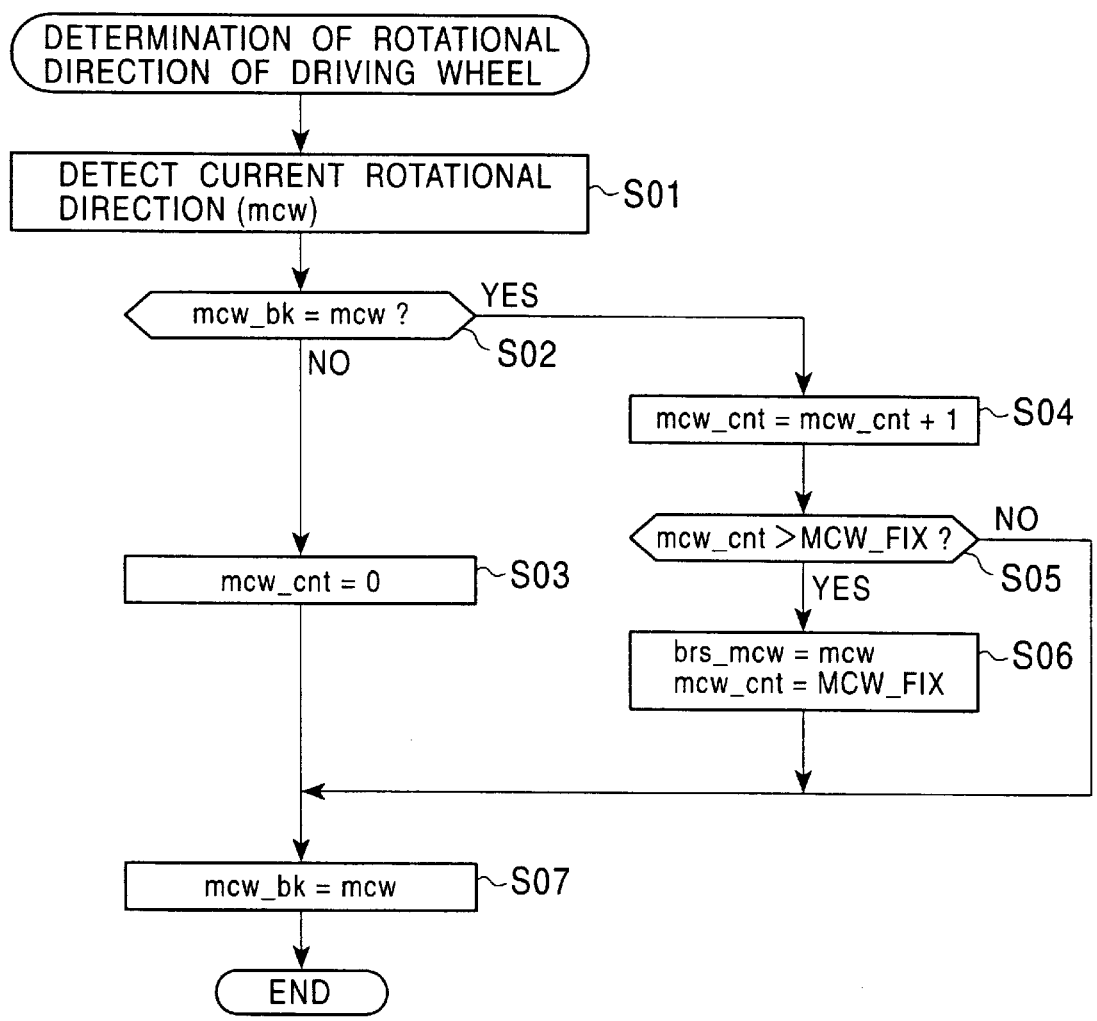
FIG. 16 is a flowchart of the operation of determining the rotational direction of the driving wheels in the control apparatus according to the second embodiment.

FIG. 15 is a flowchart corresponding to FIG. 2 of the first embodiment, and the steps at which the same processes are performed are denoted by the same reference numerals. FIG. 16 is a flowchart of a subroutine for determining the rotational direction of the driving wheel 4, and this subroutine is implemented each time a pulse is output from one of the Hall elements H (FIG. 1). The running time of this subroutine is sufficiently short compared to the time interval at which the pulses are generated. When the size of each driving wheel 4 is 22 inches, for example, the pulses are output every time the vehicle moves approximately 1.8 cm in the forward or reverse direction.

With reference to FIG. 16, at S01, the CPU detects the current rotational direction, and defines the detected rotational direction as mcw. Then, at S02, the CPU compares mcw with the rotational direction detected at the previous cycle mcw_bk. When mcw and mcw_bk are different, the CPU sets the amount of rotation mcw_cnt to 0 at S03. Then, at S07, the CPU memorizes the current rotational direction mcw as the rotational direction of the previous cycle mcw_bk.

When mcw and mcw_bk are the same at S02, the CPU adds 1 to the amount of rotation mcw_cnt at S04, and determines whether or not the increased mcw_cnt is larger than a predetermined value MCW_FIX at S05. The predetermined value MCW_FIX may be, for example, 5, which corresponds to 9 cm (1.8 cm×5) when the diameter of each driving wheel 4 is 22 inches. When the mcw_cnt is equal to or smaller than MCW_FIX, the CPU proceeds to S07, and memorizes the current rotational direction mcw as the rotational direction of the previous cycle mcw_bk. When the mcw_cnt is larger than MCW_FIX, the CPU proceeds to S06, and determines that the current rotational direction mcw is a defined rotational direction brs_mcw and sets the amount of rotation mcw_cnt to the predetermined value MCW_FIX.

According to the above-described processes of S01 to S07, the CPU increases the amount of rotation mcw_cnt until it reaches the predetermined limit when the rotational direction does not change, and memorizes the defined rotational direction brs maw. When the rotational direction is changed, the CPU resets the amount of rotation mcw_cnt, and then starts increasing the amount of rotation mcw cnt again. The rotational direction is not determined as the defined rotational direction brs_mcw until the mcw_cnt exceeds the predetermined value MCW_FIX. Accordingly, even when the rotational direction is changed, the new rotational direction is not regarded as the defined rotational direction until the driving wheel rotates by more than a predetermined amount.

Figure 17:
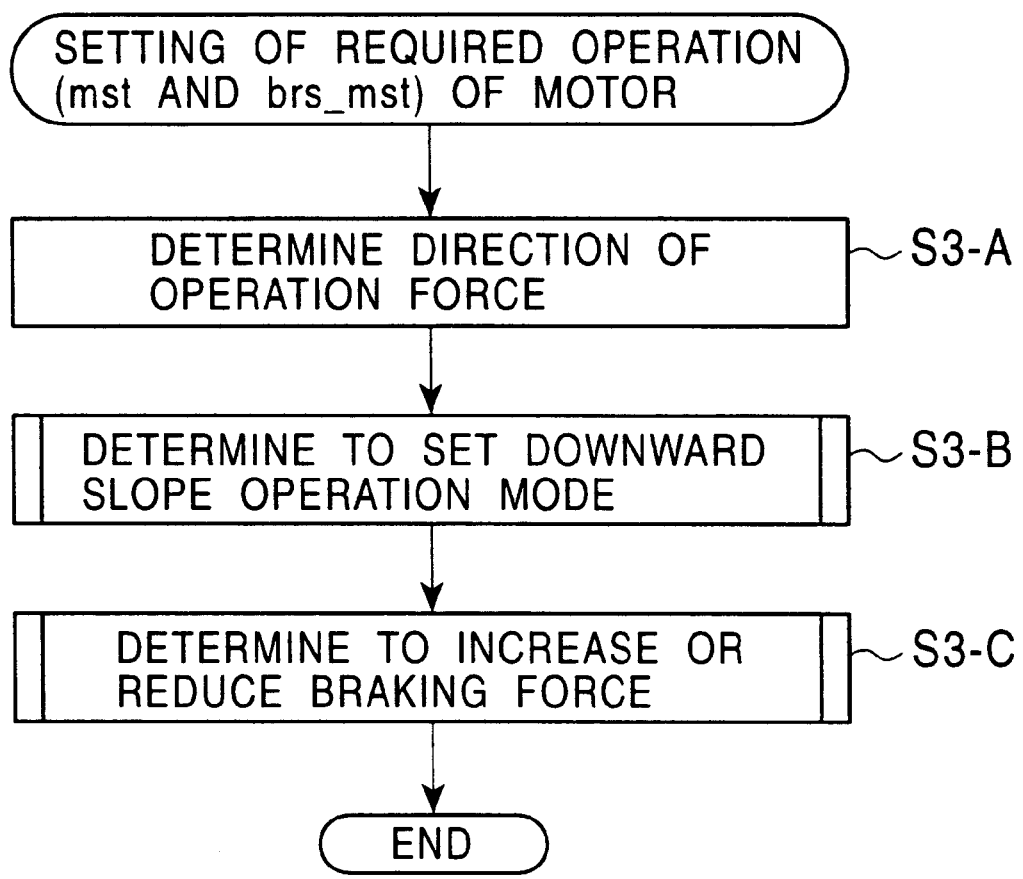
FIG. 17 is a flowchart of the operation performed at S3 in the flowchart shown in FIG. 15.

Next, a flowchart shown in FIG. 15 will be explained. First, the CPU performs input value conversion at S1 and calculates the changes in the operation forces at S2. Then, the CPU sets the required operation of each motor at S3. The required operation of the motor is expressed by both mst and brs_mst, which will be described below. FIG. 17 is a flowchart of a subroutine implemented at S3. With reference to FIG. 17, at S3-A, the CPU determines the direction of the operation force based on the operation force detection signal (FinR or FinL). Then, the CPU determines to set downward slope braking mode at S3-B, and then determines to increase or reduce the braking force at S3-C.

Figure 18:
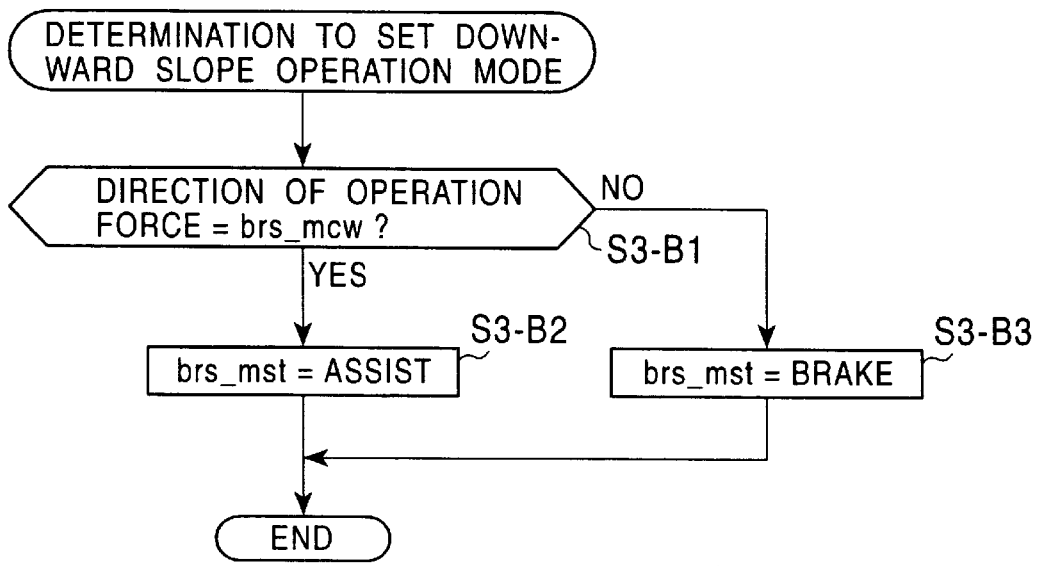
FIG. 18 is a flowchart of the operation performed at S3-B in the flowchart shown in FIG. 17.

FIG. 18 is a flowchart of a subroutine of the determination to set downward slope braking mode. First, the CPU determines whether or not the direction of the operation force is the same as the defined rotational direction brs_mcw at S3-B1. When the result is YES, the CPU sets brs_mst to "assist" at S3-B2, and when the result is NO, the CPU sets brs_mst to "brake" at S3-B3.

Figure 19:
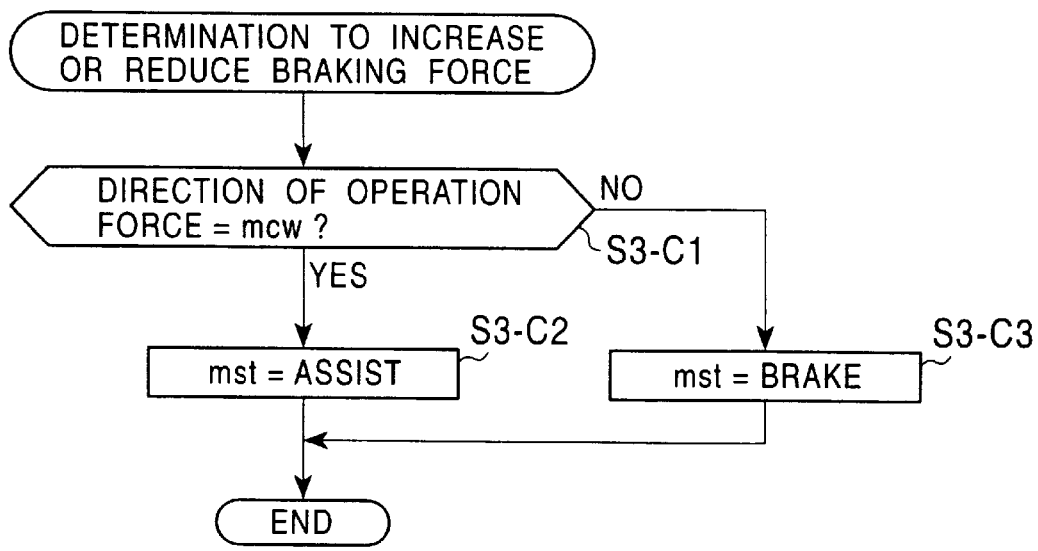
FIG. 19 is a flowchart of the operation performed at S3-C in the flowchart shown in FIG. 17.

FIG. 19 is a flowchart of a subroutine of the determination to increase or decrease the braking force. First, the CPU determines whether or not the direction of the operation force is the same as the current rotational direction mcw at S3-C1. When the result is YES, the CPU sets mst to "assist" at S3-C2, and when the result is NO, the CPU sets mst to "brake" at S3-C3.

Accordingly, brs_mst and mst are set for each of the right and left driving wheels 4. These data are used in processes which will be described below.

With reference to FIG. 15, at SA, the CPU determines whether or not brk_cnt, which is the electrical braking force in the braking mode which will be described below, is larger than 0. When the result is NO, the processes of S4 to S7, S9, S11, and S12 are performed similarly as described in the first embodiment except for the determination at SB to which the CPU proceeds when the result at S7 is NO. At SB, the CPU determines whether or not brs_mst (not mst) of the right motor and brs_mst of the left motor are both "brake". When the result is YES, the CPU proceeds to S9, and when the result is NO, the CPU proceeds to S11. When brs_mst of the right motor and brs_mst of the left motor are both "brake", the operation force and the defined rotational direction brs_mcw are different at both of the right and left driving wheels.

When the determination at SB is based on brs_mst instead of mst, the following advantages can be obtained.

When the caregiver pushes the electric wheelchair on an upward slope in a forward manner, mst of the electric wheelchair is on "assist", and the electric wheelchair is pushed by both the pushing force applied by the caregiver and the electrical assist force. When, for example, the caregiver temporarily stops the electric wheelchair while still applying the operation force in the forward direction, the driving wheels 4 may slightly rotate in the reverse direction due to gravity. In such a case, the direction of the operation force and the rotational direction of the driving wheels 4 are opposite to each other, and mst is set to "brake". Accordingly, if the determination at SB is performed based on mst as in the first embodiment, the downward slope braking mode operation is implemented at S9, and the electrical braking force is generated. In such a case, when the caregiver starts to climb the upward slope again, the motor operation signal cannot be changed immediately to "assist" due to the remaining electrical braking force brk (see FIG. 9), so that a heavy load is placed on the caregiver.

In contrast, when the determination at SB is performed based on brs_mst, the downward slope braking mode operation is not implemented since brs_mst does not change by such a slight reversal. Accordingly, the motor operation signal is maintained to "assist", and when the caregiver starts to climb the upward slope again, the electrical assist force is immediately generated, so that the load is not placed on the caregiver.

The setting of electrical braking force in the downward slope braking mode (see FIG. 7) is performed similarly as in the first embodiment, and the determination at S9-6-1 is performed based on mst. When the brs_mst is used instead, the following disadvantage is caused.

When the caregiver moves the electric wheelchair down a slope in a reverse manner, the operation force of the caregiver and the rotational direction of the driving wheels 4 are opposite, so that the downward slope braking mode operation is implemented. Then, when the caregiver stops and starts to climb up the slope, the direction of the operation force and the rotational direction of the driving wheels 4 become the same. However, brs_mst does not change until the driving wheels 4 are rotated by a predetermined amount. Thus, S9-6-6 in FIG. 7 is not implemented until the vehicle is moved by a predetermined amount, and the electrical braking force brk is thereby not reduced until then. Accordingly, a heavy load of the electric wheelchair is placed on the caregiver. In contrast, mst immediately changes from "brake" to "assist" when the caregiver starts to climb up the slope. Thus, when the determination at S9-6-1 is performed based mst, the electrical braking force brk is immediately reduced and the load on the caregiver is also reduced.

As described above, according to the second embodiment, the determination of whether or not the direction of the operation force and the rotational direction of the driving wheel are the same is performed based on one of two criterions: mst, which changes immediately, and brs_mst, which changes after the driving wheel is rotated by a predetermined amount, depending on the situation. Accordingly, optimum control can be performed in accordance with the situation.

Figure 20:
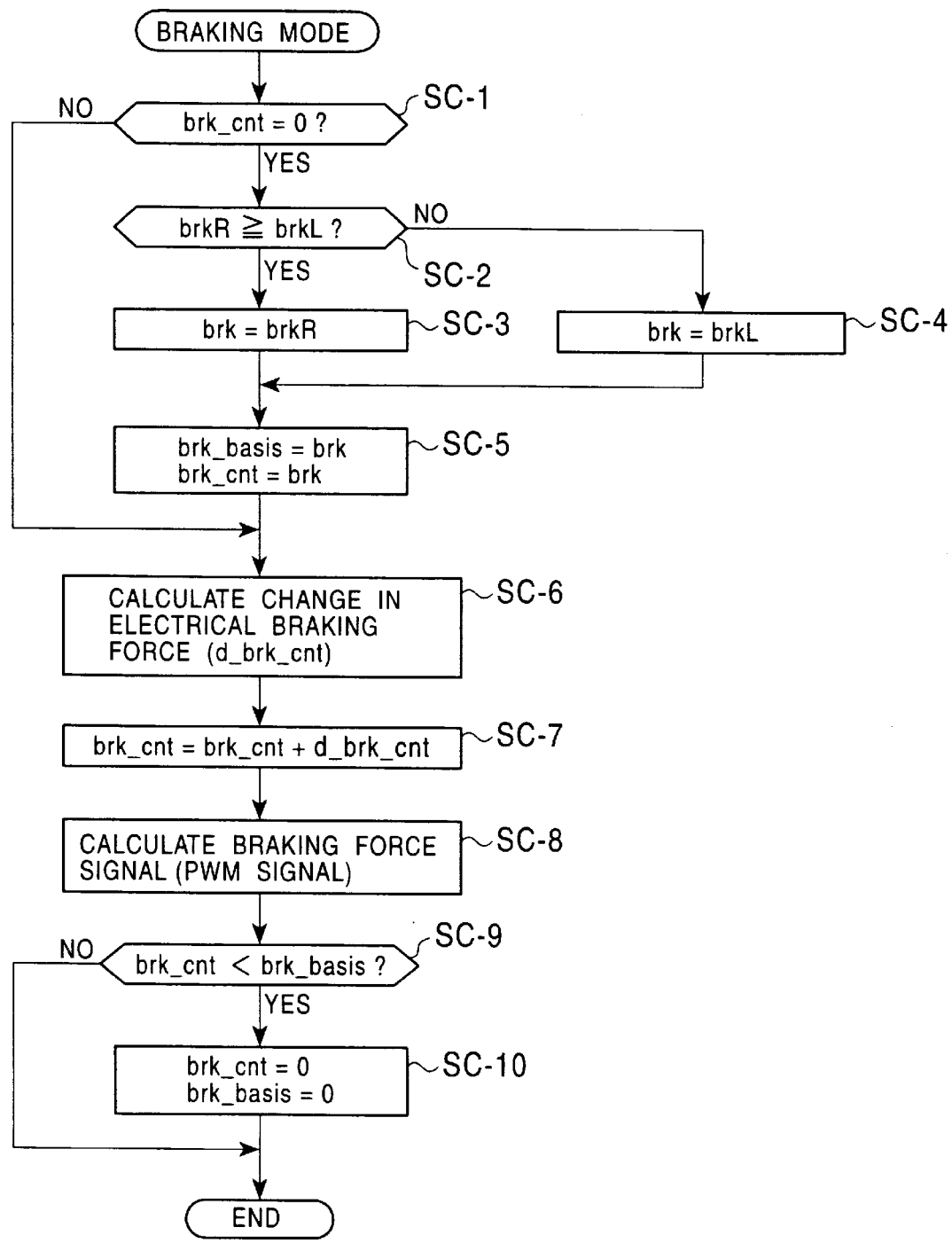
FIG. 20 is a flowchart of the operation performed at SC in the flowchart shown in FIG. 15.

Next, the braking mode (SC in FIG. 15) will be described below. FIG. 20 is a flowchart of the braking mode operation. For example, a case is considered in which the downward slope braking mode operation is implemented while the caregiver moves the electric wheelchair down a slope in a forward manner and then takes his or her hands off, so that the operation mode changes to braking mode. First, the CPU determines whether or not the above-described brk_cnt is 0 at SC-1. Normally, brk_cnt is initially 0 when the braking mode operation starts, so that the CPU proceeds to SC-2. Then, the CPU compares the electrical braking forces of the right and left motors brkR and brkL, and determines the larger one as brk (SC-3 and SC-4). Then, at SC-5, the CPU memorizes brk as the initial value brk basis and as the electrical braking force in the braking mode brk_cnt.

Then, the CPU calculates the change in the electrical braking force d_brk_cnt at step SC-6, and determines the updated electrical braking force brk_cnt by adding the above-described change to the initial electrical braking force brk_cnt (when the change is negative, the calculation is subtraction) at SC-7. Then, the CPU calculates the braking force signal (PWM signal) based on the result of the updated electrical braking force brk_cnt. Next, at SC-9, the CPU determines whether or not the electrical braking force brk_cnt is smaller than the initial value brk_basis. When the result is NO, the CPU ends this routine and when the result is YES, the CPU proceeds to SC-10 and sets both the electrical braking force brk_cnt and the initial value brk_basis to 0.

When the first cycle of the above-described braking mode operation is finished without implementing SC-10, the result of the determination at SA in FIG. 15 in the next cycle is YES. Thus, the braking mode operation is implemented again at SC. Then, in the second and following cycles of the braking mode operation, without implementing SC-10 the CPU jumps to SC-6 from SC-1 since brk cnt is not 0, and the same processes as described above are subsequently performed.

When the above-described braking mode operation is finished after SC-10 is implemented, the result of the determination at SA in FIG. 15 in the next cycle is NO since brk_cnt=0. Thus, determinations regarding the operation force detection signals and the changes in the operation forces are performed at S4 and S5 in FIG. 15. Accordingly, when the caregiver starts to apply the operation forces to the electric vehicle again by this time, the downward slope braking mode operation can be performed again. When the caregiver does not start to apply the operation forces by this time, that is, when the hands of the caregiver are still off, the CPU proceeds to SC from S5, and the braking mode operation is performed again. In such a case, since brk_cnt=0 at SC-1 in FIG. 20, the CPU proceeds to SC-2 from SC-1, and the same processes as described above are performed.

According to the above-described braking mode operation, the initial value of the electrical braking force generated used at SC-7 is set to the electrical braking force brk applied in the downward slope braking mode at SC-5. Thus, the final value of the electrical braking force applied in the downward slope braking force is continuously generated as the initial value thereof in the braking mode. Accordingly, the temporary loss of the braking force does not occur immediately after the operation mode is changed to braking mode.

In addition, in the braking mode operation, as SC-5, both brk_basis and brk_cnt are set to the electrical braking force brk applied in the downward slope braking mode, and the braking force signal is calculated based on only brk_cnt. Accordingly, the value of the electrical braking force brk applied in the downward slope braking mode operation is memorized during the braking mode operation. Then, when the operation mode is changed from the braking mode to the downward slope braking mode again, the updated electrical braking force (FIG. 7) is determined based on the memo- rized electrical braking force, and the downward slope braking mode is performed based on the updated electrical braking force. Accordingly, the temporary loss of braking force does not occur immediately after the operation mode is changed to the downward slope braking mode again.

What is claimed is:

1. A control apparatus for an electric vehicle having wheels driven by motors, said control apparatus comprising:

operation force detecting means for detecting a direction and an amount of an operation force applied to said electric vehicle by an operator;

rotational direction detecting means for detecting a rotational direction of each of said wheels of said electric vehicle; and a control unit which controls each of said motors such that each of said motors generates a driving force in accordance with the operation force detected by said operation force detecting means and that, when said control unit determines that the rotational direction of each of said wheels detected by said rotational direction detecting means is opposite to the rotational direction corresponding to the direction of the operation force detected by said operation force detecting means, each of said motors generates an electrical braking force.

2. The control apparatus for an electric vehicle according to claim 1, wherein said control unit increases the electrical braking force as the operation force is increased, the operation force being applied in the direction corresponding to the rotational direction opposite to the rotational direction of the corresponding wheel and being detected by said operation force detecting means.

3. The control apparatus for an electric vehicle according to claim 2, wherein said control unit determines the electrical braking force by accumulating a change therein, and wherein the absolute value of the change in the electrical braking force is increased as the operation force detected by said operation force detecting means is increased.

4. The control apparatus for an electric vehicle according to claim 3, wherein a change in the electrical braking force is set to 0 when said operation force detected by the operation force detecting means is less than a predetermined value, and, when the operation force detected by said operation force detecting means exceeds the predetermined value, the absolute value of the change in the electrical braking force is increased in accelerating manner as the operation force detected by said operation force detecting means is increased.

5. The control apparatus for an electric vehicle according to claim 3, wherein an initial value of the electrical braking force is a fixed value.

6. The control apparatus for an electric vehicle according to claim 1, wherein, when the electrical braking force is generated, said control unit reduces the electrical braking force as the operation force is increased, the operation force being applied in the direction corresponding to the same rotational direction as the rotational direction of the corresponding wheel and being detected by said operation force detecting means.

7. The control apparatus for an electric vehicle according to claim 6, wherein said control unit determines the electrical braking force by accumulating a change therein, and wherein the absolute value of the change in the electrical braking force is increased as the operation force detected by said operation force detecting means is increased.

8. The control apparatus for an electric vehicle according to claim 7, wherein a change in the electrical braking force is 0 when said operation force detected by the operation force detecting means is less than a predetermined value, and, when the operation force detected by said operation force detecting means exceeds the predetermined value, the absolute value of the change in the electrical braking force is increased in accelerating manner as the operation force detected by said operation force detecting means is increased.

9. The control apparatus for an electric vehicle according to claim 7, wherein the electrical braking force has an initial value which is a fixed value.

10. The control apparatus for an electric vehicle according to claim 1, wherein said control unit controls said motors for driving right and left wheels such that said motors generate the electrical braking forces independently of each other, and wherein said control unit gradually increases the smaller one of the electrical braking forces so as to make the smaller one of the electrical braking forces closer to the larger one.

11. The control apparatus for an electric vehicle according to claim 1, wherein said control unit sets the electrical braking force to 0 when a state, in which the corresponding wheel is stationary and the operation force detected by said operation force detecting means is less than a predetermined value, is maintained for a predetermined period of time.

12. A control apparatus for an electric vehicle having wheels driven by motors, said control apparatus comprising:
   operation force detecting means for detecting a direction and an amount of an operation force applied to said electric vehicle by an operator;
   rotational direction detecting means for detecting a rotational direction and the amount of rotation of each of said wheels of said electric vehicle; and
   a control unit which controls each of said motors such that each of said motors generates a driving force in accordance with the operation force detected by said operation force detecting means and that, when said control unit determines that each of said wheels is rotated by a predetermined amount in a rotational direction and that the rotational direction is opposite to the rotational direction corresponding to the direction of the operation force detected by said operation force detecting means, each of said motors generates an electrical braking force.

13. A control apparatus for an electric vehicle having wheels driven by motors, said control apparatus comprising:
   operation force detecting means for detecting a direction and an amount of an operation force applied to said electric vehicle by an operator;
   rotational direction detecting means for detecting a rotational direction of each of said wheels of said electric vehicle; and
   a control unit which controls each of said motors in accordance with the operation force detected by said operation force detecting means, and which selectively switches an operation mode for each of said motors over a driving mode in which each of said motors generates a driving force in accordance with the operation force detected by said operation force detecting means, a braking mode in which each of said motors generates an electric driving force when the absolute value of the operation force detected by said operation force detecting means is less than a predetermined value, and a downward slope braking mode in which each of said motors generates an electric braking force when the rotational direction of each of said wheels detected by said rotational direction detecting means is opposite to the rotational direction corresponding to the direction of the operation force detected by said operation force detecting means.

14. The control apparatus for an electric vehicle according to claim 13, wherein, when said control unit switches the operation mode from the downward slope braking mode to the braking mode, the initial electrical braking force generated in the braking mode is set to the electrical braking force generated in the end of the downward slope braking mode.

15. The control apparatus for an electric vehicle according to claim 13, wherein, when said control unit switches the operation mode from the braking mode to the downward slope braking mode, the initial electrical braking force generated in the downward slope braking mode is set to the electrical braking force generated in the previous downward slope braking mode operation.

16. The control apparatus for an electric vehicle according to claim 13, wherein, when the operation mode is not the downward slope braking mode, and when said control unit determines that the corresponding wheel is rotated by a predetermined amount in a rotational direction and that the rotational direction is opposite to the rotational direction corresponding to the direction of the operation force detected by said operation force detecting means, said control unit switches the operation mode to the downward slope braking mode.

17. The control apparatus for an electric vehicle according to claim 16, wherein, said control unit sets the electrical braking in the downward slope braking mode operation based on only the rotational direction of the corresponding wheel detected by said rotational direction detecting means and the rotational direction corresponding to the direction of the operation force detected by said rotational force detecting means.

* * * * *